US005651002A

United States Patent [19]
Van Seters et al.

[11] Patent Number: 5,651,002
[45] Date of Patent: Jul. 22, 1997

[54] INTERNETWORKING DEVICE WITH ENHANCED PACKET HEADER TRANSLATION AND MEMORY

[75] Inventors: Stephen L. Van Seters, Stow; Christopher P. Lawler, Wellesley; David C. Ready, Sudbury, all of Mass.

[73] Assignee: 3COM Corporation, North Billerica, Mass.

[21] Appl. No.: 502,087

[22] Filed: Jul. 12, 1995

[51] Int. Cl.⁶ .............................. H04J 3/26; H04L 12/46
[52] U.S. Cl. ...................... 370/392; 370/401; 395/200.02
[58] Field of Search ............................ 370/85.13, 85.14, 370/60, 60.1, 94.1, 94.2, 94.3, 389, 390, 392, 393, 394, 395, 397, 399, 401, 402, 409; 395/200.02, 200.2, 427, 432, 250, 200.17, 200.16, 200.06

[56] References Cited

U.S. PATENT DOCUMENTS

| | | | |
|---|---|---|---|
| 4,455,602 | 6/1984 | Baxter, III et al. | 364/200 |
| 4,488,004 | 12/1984 | Bogart et al. | 179/18 AD |
| 4,525,780 | 6/1985 | Bratt et al. | 364/200 |
| 4,562,436 | 12/1985 | Coleman et al. | 340/825 |
| 4,578,796 | 3/1986 | Charalambous et al. | 375/8 |
| 4,587,651 | 5/1986 | Nelson et al. | 370/88 |
| 4,597,077 | 6/1986 | Nelson et al. | 370/88 |
| 4,645,874 | 2/1987 | Fildes | 379/93 |
| 4,663,748 | 5/1987 | Karbowiak et al. | 370/89 |
| 4,679,191 | 7/1987 | Nelson et al. | 370/84 |
| 4,713,806 | 12/1987 | Oberlander et al. | 370/58 |
| 4,720,850 | 1/1988 | Oberlander et al. | 379/90 |
| 4,737,953 | 4/1988 | Koch et al. | 370/94 |
| 4,748,618 | 5/1988 | Brown et al. | 370/94 |
| 4,750,114 | 6/1988 | Hirtle | 364/200 |
| 4,768,149 | 8/1988 | Konopik et al. | 364/200 |
| 4,831,620 | 5/1989 | Conway et al. | 370/85 |
| 4,835,674 | 5/1989 | Collins et al. | 364/200 |
| 4,843,606 | 6/1989 | Bux et al. | 370/89 |
| 4,872,158 | 10/1989 | Richards | 370/58.1 |
| 4,872,159 | 10/1989 | Hemmady et al. | 370/60 |
| 4,872,160 | 10/1989 | Hemmady et al. | 370/60 |
| 4,875,206 | 10/1989 | Nichols et al. | 370/85.15 |
| 4,893,302 | 1/1990 | Hemmady et al. | 370/60 |
| 4,894,824 | 1/1990 | Hemmady et al. | 370/58.3 |
| 4,899,333 | 2/1990 | Roediger | 370/60 |
| 4,912,656 | 3/1990 | Cain et al. | 364/514 |
| 4,922,486 | 5/1990 | Lidinsky et al. | 370/60 |
| 4,933,846 | 6/1990 | Humphrey et al. | 364/200 |
| 4,933,938 | 6/1990 | Sheehy | 370/85.13 |
| 4,939,728 | 7/1990 | Markkula, Jr. et al. | 370/94.3 |
| 4,954,951 | 9/1990 | Hyatt | 364/200 |
| 4,955,018 | 9/1990 | Twitty et al. | 370/85.1 |
| 4,958,341 | 9/1990 | Hemmady et al. | 370/60.1 |
| 5,021,949 | 6/1991 | Morton et al. | 364/200 |
| 5,042,000 | 8/1991 | Baldwin | 364/726 |
| 5,048,014 | 9/1991 | Fischer | 370/85.5 |
| 5,095,480 | 3/1992 | Fenner | 370/94.1 |
| 5,101,402 | 3/1992 | Chiu et al. | 370/17 |
| 5,113,522 | 5/1992 | Dinwiddie, Jr.et al. | 395/700 |
| 5,123,029 | 6/1992 | Bantz et al. | 371/1 |
| 5,127,104 | 6/1992 | Dennis | 395/650 |

(List continued on next page.)

*Primary Examiner*—Hassan Kizou
*Assistant Examiner*—Kwang Bin Yao
*Attorney, Agent, or Firm*—Weingarten, Schurgin, Gagnebin & Hayes LLP

[57] ABSTRACT

An internetworking device providing enhanced packet header translation for translating the format of a header associated with a source network into a header format associated with a destination network of a different type than the source network. The device includes a memory for storing an address portion of a received packet header in a first block of buffer locations and the remainder of the received packet in a second block of buffer locations, spaced from the first block of buffer locations by a gap. The gap permits supplemental header information to be written into the buffer when necessary for translation. The device further includes a split memory, having an SRAM portion and a DRAM portion allocated to each buffer, with at least the address portion of a received packet and the gap located in the SRAM portion, so as to optimize the translation performance of the device.

25 Claims, 18 Drawing Sheets

U.S. PATENT DOCUMENTS

| | | | |
|---|---|---|---|
| 5,144,692 | 9/1992 | Baker et al. | 395/425 |
| 5,155,809 | 10/1992 | Baker et al. | 395/200 |
| 5,159,592 | 10/1992 | Perkins | 370/85.7 |
| 5,163,138 | 11/1992 | Thirumalai | 395/325 |
| 5,166,931 | 11/1992 | Riddle | 370/94.1 |
| 5,185,877 | 2/1993 | Bissett et al. | 395/425 |
| 5,200,954 | 4/1993 | Teel, Jr. et al. | 370/94.1 |
| 5,208,811 | 5/1993 | Kashio et al. | 370/94.1 |
| 5,210,748 | 5/1993 | Onishi et al. | 370/85.13 |
| 5,235,595 | 8/1993 | O'Dowd | 370/94.1 |
| 5,247,620 | 9/1993 | Fukuzawa et al. | 395/325 |
| 5,251,205 | 10/1993 | Callon et al. | 370/60 |
| 5,265,207 | 11/1993 | Zak et al. | 395/200 |
| 5,280,474 | 1/1994 | Nickolls et al. | 370/60 |
| 5,282,199 | 1/1994 | Hertzberg et al. | 370/85.14 |
| 5,283,868 | 2/1994 | Baker et al. | 395/200 |
| 5,291,444 | 3/1994 | Scott et al. | 365/189.05 |
| 5,299,193 | 3/1994 | Szczepanek | 370/85.1 |
| 5,301,273 | 4/1994 | Konishi | 395/200 |
| 5,301,303 | 4/1994 | Abraham et al. | 395/500 |
| 5,305,280 | 4/1994 | Hayano | 365/230.03 |
| 5,305,317 | 4/1994 | Szczepanek | 370/85.5 |
| 5,307,345 | 4/1994 | Lozowick et al. | 370/61 |
| 5,309,432 | 5/1994 | Kanakia | 370/60 |
| 5,317,568 | 5/1994 | Bixby et al. | 370/85.6 |
| 5,321,819 | 6/1994 | Szczepanek | 395/325 |
| 5,321,843 | 6/1994 | Shoji et al. | 395/800 |
| 5,325,356 | 6/1994 | Lyles | 370/60 |
| 5,327,421 | 7/1994 | Hiller et al. | 370/60.1 |
| 5,327,428 | 7/1994 | Van As et al. | 370/94.2 |
| 5,329,630 | 7/1994 | Baldwin | 395/425 |
| 5,331,191 | 7/1994 | Sugiura et al. | 257/336 |
| 5,331,315 | 7/1994 | Crosetto | 340/825.02 |
| 5,331,634 | 7/1994 | Fischer | 370/85.13 |
| 5,333,268 | 7/1994 | Douglas et al. | 395/200 |
| 5,355,365 | 10/1994 | Bhat et al. | 370/85.13 |
| 5,355,453 | 10/1994 | Row et al. | 395/200 |
| 5,371,852 | 12/1994 | Attanasio et al. | 395/200 |
| 5,379,296 | 1/1995 | Johnson et al. | 370/60 |
| 5,390,173 | 2/1995 | Spinney et al. | 370/60 |
| 5,392,399 | 2/1995 | Gilbrech | 395/200 |
| 5,428,615 | 6/1995 | Backes et al. | 370/85.13 |
| 5,434,864 | 7/1995 | Perlman et al. | 370/85.13 |
| 5,440,691 | 8/1995 | Carrafiello et al. | 395/250 |
| 5,442,633 | 8/1995 | Perkins et al. | 370/94.1 |
| 5,448,565 | 9/1995 | Chang et al. | 370/85.13 |
| 5,465,331 | 11/1995 | Yang et al. | 395/200.08 |
| 5,483,640 | 1/1996 | Isfeld et al. | 395/200.03 |
| 5,502,726 | 3/1996 | Fischer | 370/94.1 |
| 5,511,024 | 4/1996 | Ware et al. | 365/189.04 |

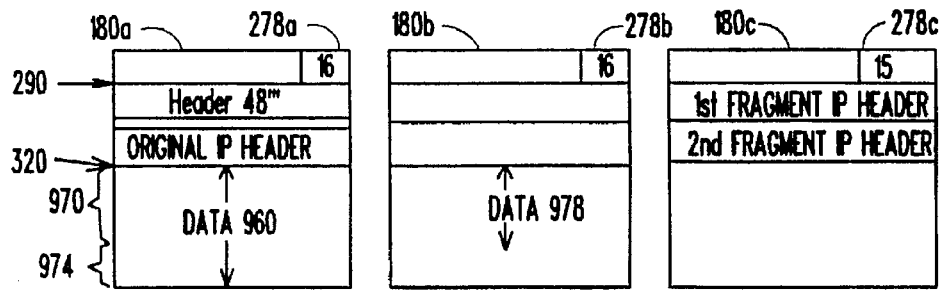

| | TRANSMIT QUEUE ENTRIES | | 596 | 598 | 600 | |
|---|---|---|---|---|---|---|
| 160 | DESTINATION PORT/MAC | BUFFER | EDF | FB | PH | DATA DESCRIPTION |
| ENTRY 1 | non-receiving FDDI MAC | 180a | 1 | 0 | 0 | HEADER 48'''; ORIGINAL IP HEADER; DATA 960 |
| ENTRY 2 | non-receiving FDDI-MAC | 180b | 0 | 0 | 1 | DATA 978 |
| ENTRY 3 | 1st ETHERNET MAC- 1st FRAGMENT | 180a | 1 | 1 | 1 | HEADER 48''' |
| ENTRY 4 | 1st ETHERNET MAC- 1st FRAGMENT | 180c | 1 | 1 | 1 | 1st FRAGMENT IP HEADER |
| ENTRY 5 | 1st ETHERNET MAC- 1st FRAGMENT | 180a | 0 | 1 | 1 | DATA 970 |
| ENTRY 6 | 1st ETHERNET MAC- 2nd FRAGMENT | 180a | 1 | 1 | 1 | HEADER 48''' |
| ENTRY 7 | 1st ETHERNET MAC- 2nd FRAGMENT | 180c | 1 | 0 | 1 | 2nd FRAGMENT IP HEADER |
| ENTRY 8 | 1st ETHERNET MAC- 2nd FRAGMENT | 180a | 1 | 0 | 1 | DATA 974 |
| ENTRY 9 | 1st ETHERNET MAC- 2nd FRAGMENT | 180b | 0 | 0 | 1 | DATA 978 |
| ENTRY 10 | 2nd ETHERNET MAC- 1st FRAGMENT | 180a | 1 | 1 | 1 | HEADER 48''' |
| ENTRY 11 | 2nd ETHERNET MAC- 1st FRAGMENT | 180c | 1 | 1 | 1 | 1st FRAGMENT IP HEADER |
| ENTRY 12 | 2nd ETHERNET MAC- 1st FRAGMENT | 180a | 0 | 1 | 1 | DATA 970 |
| ENTRY 13 | 2nd ETHERNET MAC- 2nd FRAGMENT | 180a | 1 | 1 | 1 | HEADER 48''' |
| ENTRY 14 | 2nd ETHERNET MAC- 2nd FRAGMENT | 180c | 1 | 0 | 1 | 2nd FRAGMENT IP HEADER |
| ENTRY 15 | 2nd ETHERNET MAC- 2nd FRAGMENT | 180a | 1 | 0 | 1 | DATA 974 |
| ENTRY 16 | 2nd ETHERNET MAC- 2nd FRAGMENT | 180b | 0 | 0 | 1 | DATA 978 |

FIG. 13

INTERNETWORKING DEVICE WITH ENHANCED PACKET HEADER TRANSLATION AND MEMORY

FIELD OF THE INVENTION

This invention relates generally to an internetworking device for interconnecting networks and more particularly, to an internetworking device providing enhanced header translation for translating the format of a header associated with a source network into a format associated with a destination network of a different type than the source network and having a split memory structure for optimizing header translation.

BACKGROUND OF THE INVENTION

Networks, such as Local Area Networks (LANs), having a plurality of nodes (i.e., devices connected to the network) which communicate by transmitting packets, or frames, of information to other nodes on the network and by receiving packets of information from other nodes on the network are known. The transmitting node is referred to as the source node and the receiving node is referred to as the destination node. The packets generally include a header, data, and a trailer. The header includes an address portion identifying the source node (i.e., the source node address), and the destination node (i.e., the destination node address), and may include additional information, such as the type of data associated with the packet. The data provides the information to be communicated between the nodes, and the trailer includes error information, such as a CRC check.

Various types of networks are available, such as Ethernet version 2.0 LANs, Ethernet 802.3 LANs, and Fiber Distributed Data Interconnect (FDDI) LANs. It is often advantageous to permit communication between nodes on different networks of the same or different type (i.e., internetworking). In the case of internetworking, the network to which the source node is attached is referred to as the source network and the network to which the destination node is attached is referred to as the destination network.

Internetworking between networks of different types is complicated by the fact that the format of the header associated with each network type varies somewhat. For example, an Ethernet version 2.0 packet header includes the destination node address, the source node address, and a type field; whereas, an Ethernet 802.3 packet header includes the destination node address, the source node address, and a length field. An FDDI packet header includes, in addition to the source and destination node addresses, a frame control entry, a Logic Link Control (LLC) portion and may include a Sub-Network Access Protocol (SNAP) portion.

Internetworking devices, such as bridges and routers, for permitting communication between nodes on more than one network of the same or different type are known. Such devices generally include a plurality of Media Access Controllers (MACs), each one connected to a respective network for controlling the receipt and transmission of packets, a memory for storing a received packet prior to transmission to a destination network, a processor for providing any necessary packet manipulation, and control circuitry for governing packet storage, manipulation, and transmission. When interconnecting networks of different types, the device converts, or translates, the packet header format associated with the source network into the header format associated with the destination network. Packet header translation may require manipulation of the stored packet, such as by providing supplemental header information for transmission with the packet.

One technique for passing packets between different network types (i.e., translational internetworking) includes reading the entire received packet into a block of sequential buffer locations. The source node address identifies the source network and thus also the header format of the received packet and the destination node address identifies the destination network and thus the header format associated with the destination node. Based on a determination of the source node header format and the destination node header format, the processor determines whether and what type of header translation is necessary to transmit the received packet to the destination node. If supplemental header information is required to render the received packet header compatible with the format associated with the destination node, then a portion of the stored packet is read out of the buffer and written back into the buffer at another location, to permit the insertion of the supplemental header information at the appropriate sequential locations of the buffer. However, this technique disadvantageously requires many memory accesses to move a portion of the stored packet to a different location in the buffer and thus results in a concomitant increase in processing time.

Another translational internetworking technique similarly requires the entire received packet to be read into a block of sequential buffer locations and a determination to be made as to what, if any, translation is necessary to convert the received packet header into a format compatible with the destination node. However, rather than read out and write back a portion of the stored header as in the above described approach, this technique employs multiple pointers in the transmission of the stored packet. More particularly, if it is determined that the stored header requires supplemental header information for transmission to the destination node, then the supplemental header information is written into a block of buffer locations which are non-sequential with respect to the buffer locations in which the received packet is stored and pointers are provided to the start of the received header, the start of the supplemental header information and the start of the remainder of the packet, after the address header portion. These pointers are used by the control circuitry upon transmission of the packet to ensure that the supplemental header information is transmitted after the received header and before the received data. However, use of multiple pointers in this manner tends to increase processing time.

Some internetworking devices are used in conjunction with Dynamic Random Access Memory (DRAM) to provide buffers for storing received packets. Although DRAM tends to be relatively inexpensive, it suffers from the drawback that memory accesses are relatively slow, with typical access latencies on the order of one or more microseconds thereby aggravating the increase in processing time typically associated with conventional header translation techniques.

Static Random Access Memory (SRAM) is sometimes preferred to DRAM for use with internetworking devices due to the relatively faster memory access times, with latencies on the order of tens or hundreds of nanoseconds. However, a tradeoff must be made in terms of processing time and cost, since SRAM tends to be more expensive than DRAM per bit of storage.

SUMMARY OF THE INVENTION

In accordance with the invention, an internetworking device for interconnecting networks is provided with header translation circuitry and methods for reducing processing delays typically associated with header translation. The device includes a memory partitioned into a plurality of buffers, each one assigned to a respective network and adapted for storing a packet received from the respective network prior to transmission to another network. A buffer manager, interconnecting the networks and the memory, controls storage of the packet in an assigned buffer so as to provide a gap in the buffer after an address portion of the packet header has been stored. In this way, the gap is inserted in the buffer between the address portion and the remainder of the packet.

The buffer gap permits the insertion of supplemental header information into the buffer between the address portion of the header and the remainder of the packet, without requiring the stored packet to be moved to different memory locations. In this way, the significant number of accesses into memory or multiple pointer use conventionally necessary to permit header translation are eliminated and thus, header translation processing time is decreased.

Also described is a method for storing a packet received by an internetworking device from a first network prior to transmission to a second network, including the steps of reading an address portion of the packet header into a first block of sequential locations of a buffer and reading a remaining portion of the packet into a second block of sequential locations of the buffer, with the first block of locations spaced from the second block of locations. The space between the two blocks of buffer locations provides a gap which is adapted to receive supplemental header information during packet header translation.

Further in accordance with the invention, a split memory for use with an internetworking device includes a first portion having a first access latency and a second portion having a second access latency longer than the first access latency. In one embodiment, the first portion is SRAM and the second portion is DRAM.

The memory is allocated to provide buffers for storing incoming packets received by the device, with each buffer having a portion in SRAM and a portion in DRAM. Preferably, at least the address portion of a received header and the gap described above are provided in the SRAM portion of the buffer. A remaining portion of the received packet may be stored in the DRAM portion of the buffer. With this arrangement, when a buffer is accessed for purposes of header translation, it is the SRAM portion of the buffer that is accessed. In this way, processing delays associated with header translation are advantageously reduced. Moreover, this process time optimization is achieved without significantly increasing the memory cost since SRAM is judiciously used only for the portion of memory accessed for translation purposes.

A method for storing a packet during transmission from a first network to a second network is also provided and includes the steps of storing an address portion of the packet header in a first portion of memory having a first access latency, such as SRAM, and storing a portion of the packet in a second portion of memory having a second access latency longer than the first access latency, such as DRAM, if the packet length exceeds the size of the first portion of memory.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 6 is illustrative of the format of data stored in the buffer memory of FIG. 4a;

FIG. 13 shows illustrative buffers containing a received FDDI packet and Transmit Queue entries associated with multicast transmission of a packet;

DESCRIPTION OF THE PREFERRED EMBODIMENT

Figure 1:
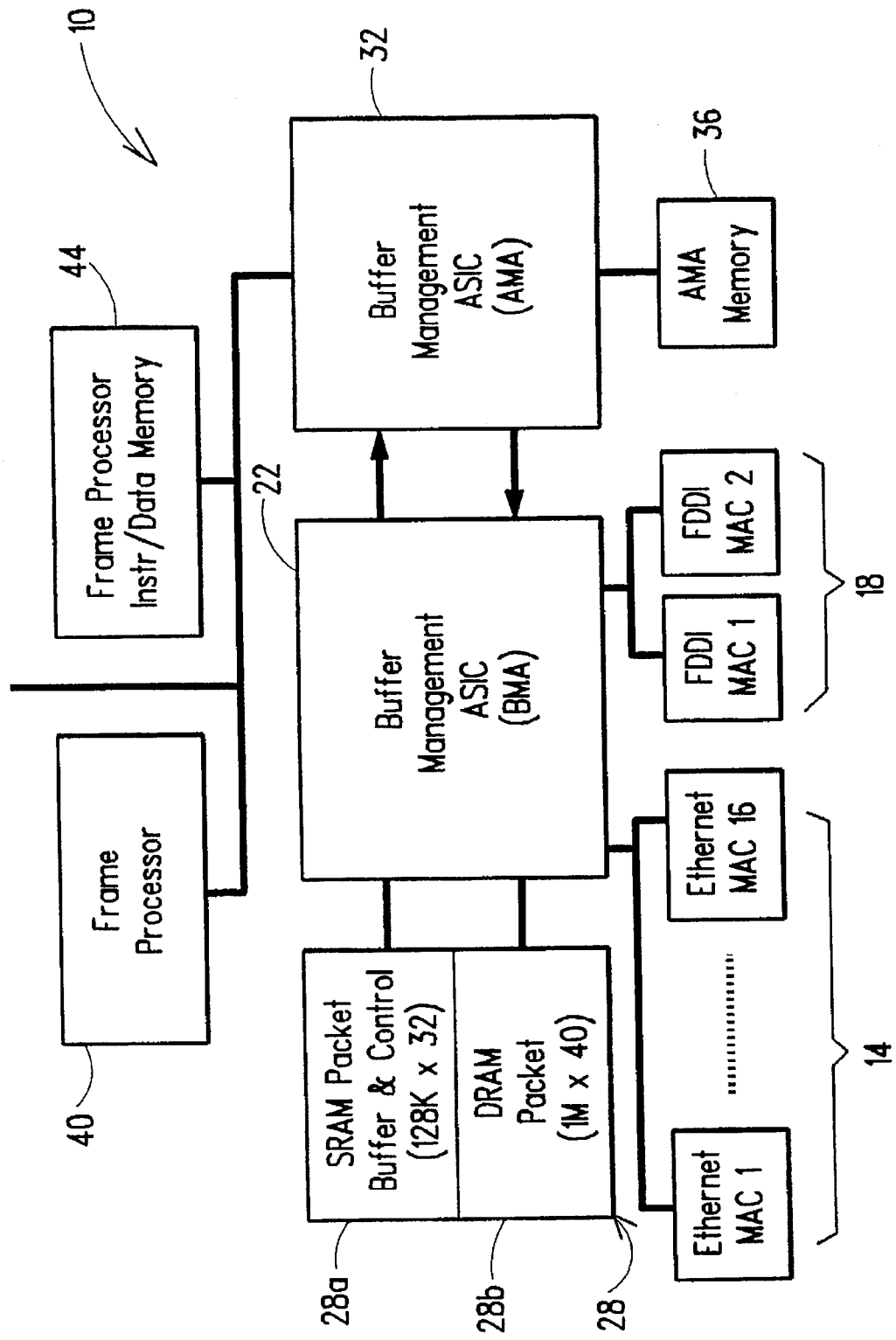
FIG. 1 is a block diagram of an embodiment of an internetworking device in accordance with the invention.

In brief overview and referring to FIG. 1, the presently disclosed internetworking device 10 includes a plurality of Ethernet Media Access Controllers (MACs) 14 (in one embodiment a total of sixteen) and one or more FDDI MACs 18 (in one embodiment a total of two). Each of the MACs provides a port for reception and transmission of data packets (frames) from/to the respective Ethernet or FDDI network (not shown). The network from which a data packet is received is referred to as a source network and the network to which a data packet is transmitted is referred to as a destination network. More specifically, the node attached to a network which from which a packet is received is referred to as a source node and the node to which a packet is transmitted is designated as a destination node. A data packet received from a source network by a MAC 14, 18 is stored in a buffer memory 28 under the control of a Buffer Management ASIC (BMA) 22 as described hereinafter. Illustrative internetworking devices 10 are bridges, or switches, which control packet communication based on data link layer information, and routers which control packet communication based on network layer information.

Figure 2:
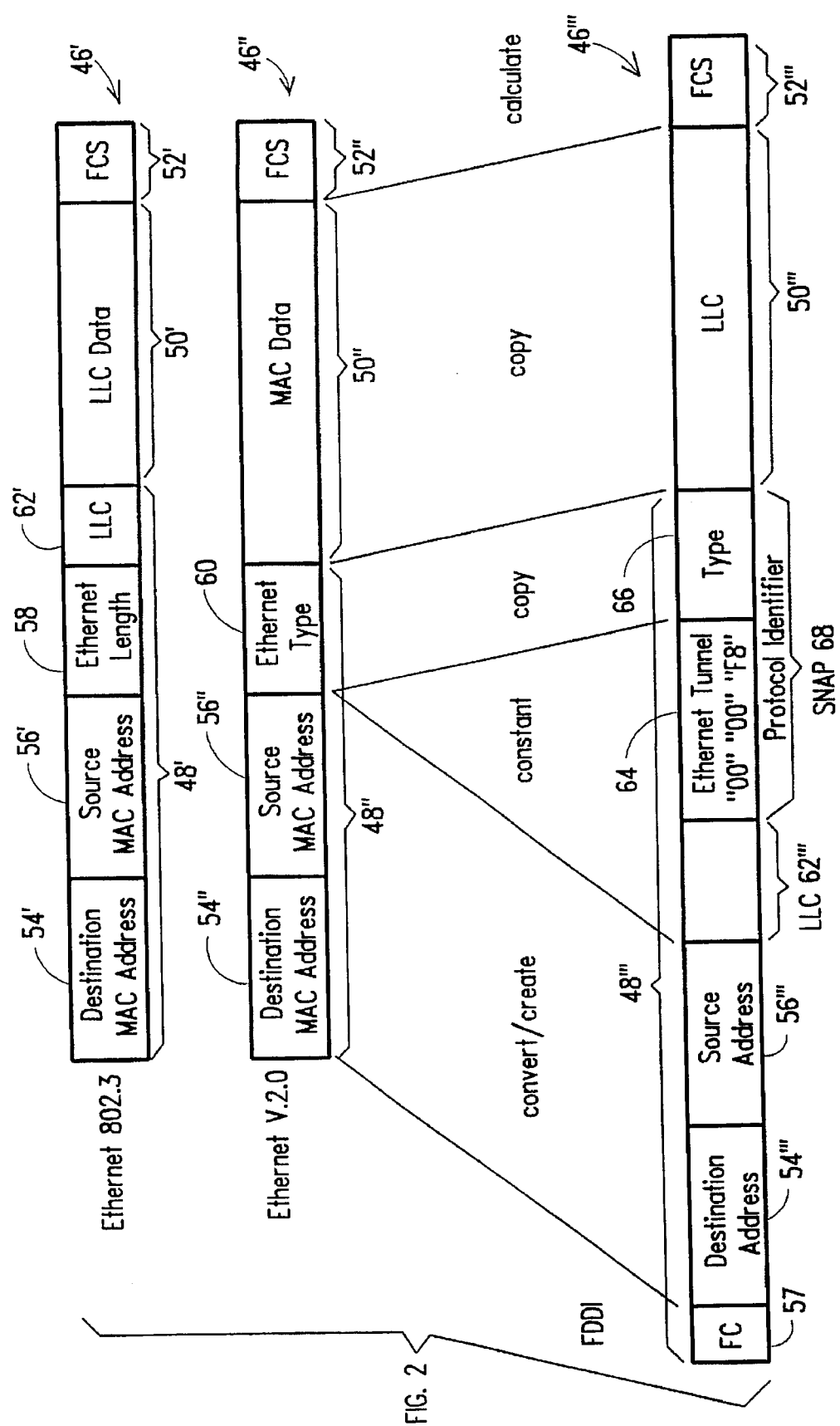
FIG. 2 shows the frame formats associated with Ethernet version 2.0, Ethernet 802.3, and FDDI networks.

Referring also to FIG. 2, the format of data packets (referred to hereinafter generally as 46) associated with an Ethernet 802.3 network (46'), an Ethernet version 2.0 network (46") and an FDDI network (46'''), respectively, is shown. Each of the data packets 46 includes a header portion, or packet header (referred to generally as 48), a data portion (referred to generally as 50), and a trailer portion (referred to generally as 52). More particularly, the Ethernet 802.3 packet 46' has a header 48', data 50' and a trailer 52', the Ethernet version 2.0 packet 46" has a header 48", data 50" and a trailer 52", and the FDDI packet 46''' has a header 48''', data 50''' and a trailer 52'''.

The header portion 48 of each of the data packets 46 includes a destination node address (referred to hereinafter generally as 54) and a source node address (referred to hereinafter generally as 56). The packet headers 48 further include network specific information. Specifically, the Ethernet 802.3 packet header 48' additionally includes a length field 58 and an LLC field 62'. The Ethernet version 2.0 packet header 48" additionally includes a type field 60. The FDDI packet header 48''' additionally includes a frame control entry 57, preceding the destination address 54''', an LLC field 62''', an Ethernet tunnel field 64 and a type field 66, following the source address 56'''. The FDDI tunnel field 64 and type field 56 are only present in certain instances and are referred to collectively as a SNAP portion 68.

The data portion 50 of the respective frames contains the information to be transferred between the networks. The trailer 52 typically includes an error detection field, such as a Cyclic Redundancy Check (CRC) or Frame Check Sequence (FCS).

The BMA 22 sends the source address 56 and the destination address 54 of the packet 46, as well as other information, to an Address Management ASIC (AMA) 32 and causes the entire data packet 46 to be stored in one or more packet buffers, located in memory 28. The portion of buffer memory 28 used to store the respective packet is associated with the respective MAC 14, 18 receiving the data packet as hereinafter described.

Figure 6:
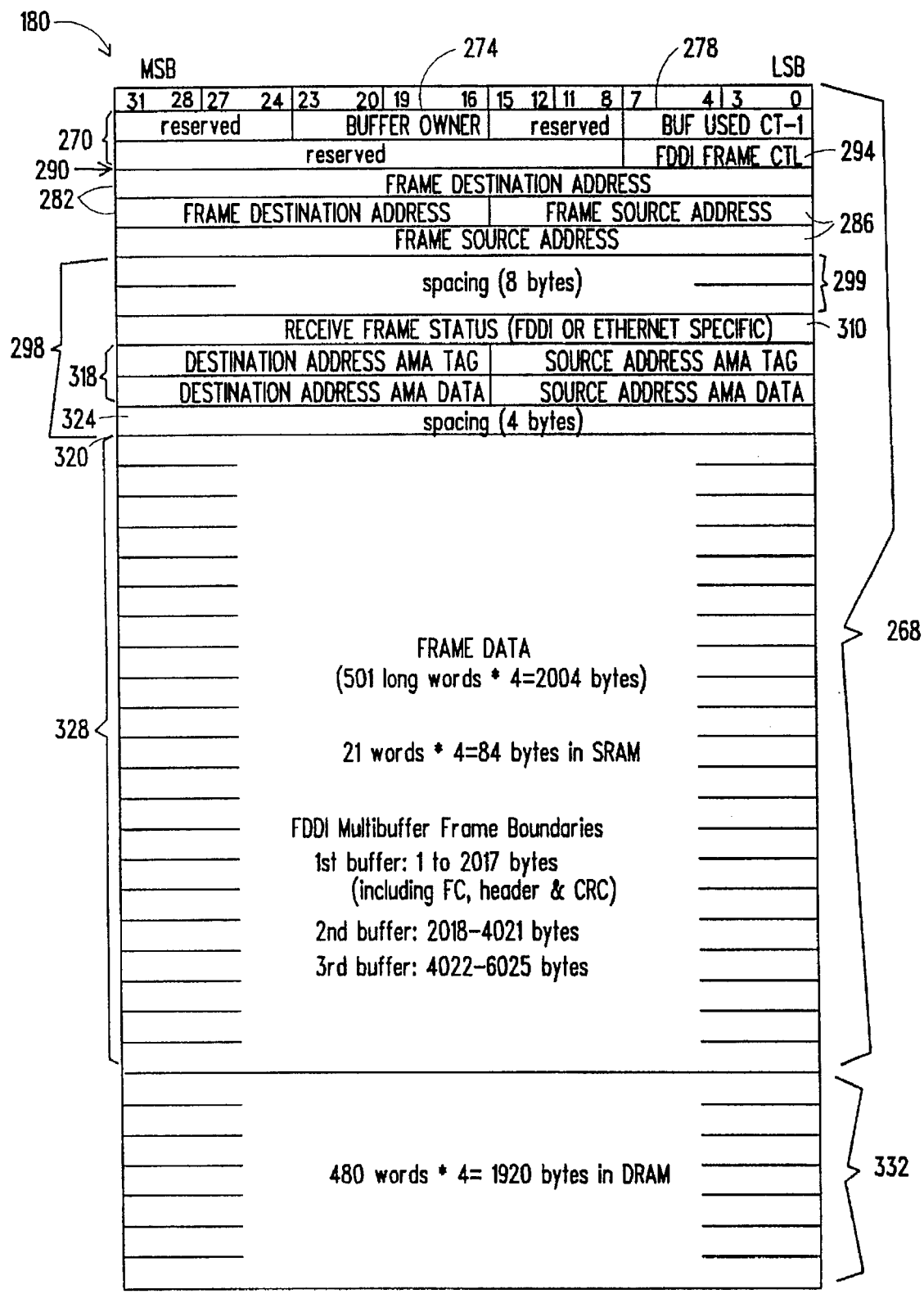

The first 96 bytes of a received Ethernet packet (or the first 97 bytes of a received FDDI packet) are stored in an SRAM portion 28a of memory 28 and any remaining bytes of the received packet are stored in a DRAM portion 28b of memory 28. After a predetermined number of bytes (which include the destination and source addresses) have been stored in SRAM 28a, a gap is "inserted" in the buffer memory 28 between the source address 56 and the remainder of the packet (as shown in FIG. 6 and described in detail below). That is, after the destination and source addresses are stored sequentially, the remaining portion of the received packet is stored beginning at a memory location separated from the last used buffer address so as to create a gap in memory 28. This gap is used by the device 10 to facilitate translation of the header 48 received from a source network when the packet must be reconfigured to a header format compatible with a destination network which differs from the source network, as will be described.

The AMA 32 uses the information received from the BMA 22 to attempt to determine to which MAC 14, 18, (referred to also as port) the network associated with the destination node address of the received data packet is attached. The information may also be used by the AMA 32 either to learn of the existence of a source node which is not recognized by the AMA 32 or to determine that the source node of the data packet is an active node whose address should not be removed ("aged") from a table of node addresses located in AMA memory 36 as a result of inactivity.

The AMA 32 determines which MAC 14, 18 or port is to transmit the packet 46 by searching the address table in AMA memory 36. This table contains a list of known node addresses and additionally a designation for the respective MAC 14, 18 corresponding to each node address. The source address 56 is searched in the address table using a binary search technique. Likewise, the destination address 54 is searched in the address table using a binary search technique. The searches are conducted substantially simultaneously by interleaving the source address and destination address searches during alternate clock cycles, as described in a co-pending patent application entitled "Address Management for an Internetworking Device" (Attorney Docket No. SYNER-106XX) filed on even date herewith and assigned to the assignee of the present invention and incorporated herein by reference.

Using information provided by the AMA 32, the BMA 22 generates, within a small number of clock cycles, a code vector which determines whether and how the received stored data packet 46 is to be processed by a frame processor unit (FPU) 40 and transmitted from the device 10, as is described in greater detail in a co-pending patent application entitled "Packet Characterization Using Code Vectors" (Attorney Docket No. SYNER-103XX) filed on even date herewith and assigned to the assignee of the present invention and incorporated herein by reference. For example, in the case where the received data packet 46 has a destination address 54 corresponding to a different type of network than the source network thereby requiring translation of the packet header 48, such as by the insertion of additional header information, a predetermined code vector is generated by the BMA 22. The predetermined code vector instructs the FPU 40 to execute a program stored in a frame processor memory 44 and to write the necessary header information into the gap in the buffer in which the received packet 46 is stored.

Conversely, if the received data packet 46 has a destination address 54 corresponding to the same type of network as the source network (and if certain other criteria are met), then another code vector is generated by the BMA 22. This code vector instructs the FPU 40 to execute code stored in frame processor memory 44 to begin transmitting the packet 46 to the destination address 54 before the packet 46 is entirely received by the device 10. The technique of beginning data transmission prior to the receipt of the entire packet 46 is referred to as cut-through. Cut-through is achieved without manipulation of the stored packet 46 by the FPU 40 and is described in detail in a co-pending patent application entitled "Method and Apparatus for the Concurrent Reception and Transmission of a Data Packet in an Internetworking Device" (Attorney Docket No. SYNER-104XX) filed on even date herewith and assigned to the assignee of the present invention and incorporated herein by reference.

Thus, the two above-described conditions result in the generation of two different code vectors by the BMA 22. In one embodiment, thirty-one different code vectors may be generated in response to thirty-one different states of the internetworking device 10 and received packet 46.

The code executed by the FPU 40 instructs the BMA 22 to enqueue a Transmit Queue entry on a Transmit Queue, and then instructs the BMA 22 to transmit the packet 46 from the device 10 to the destination address 54. Once the Transmit Queue entry is enqueued, the FPU 40 can continue processing subsequent packets 46. After the data packet is transmitted by the respective MAC 14, 18 associated with the destination address 54, the buffer in which the packet 46 was stored may be returned and reused to store subsequent packets 46.

Figure 3:
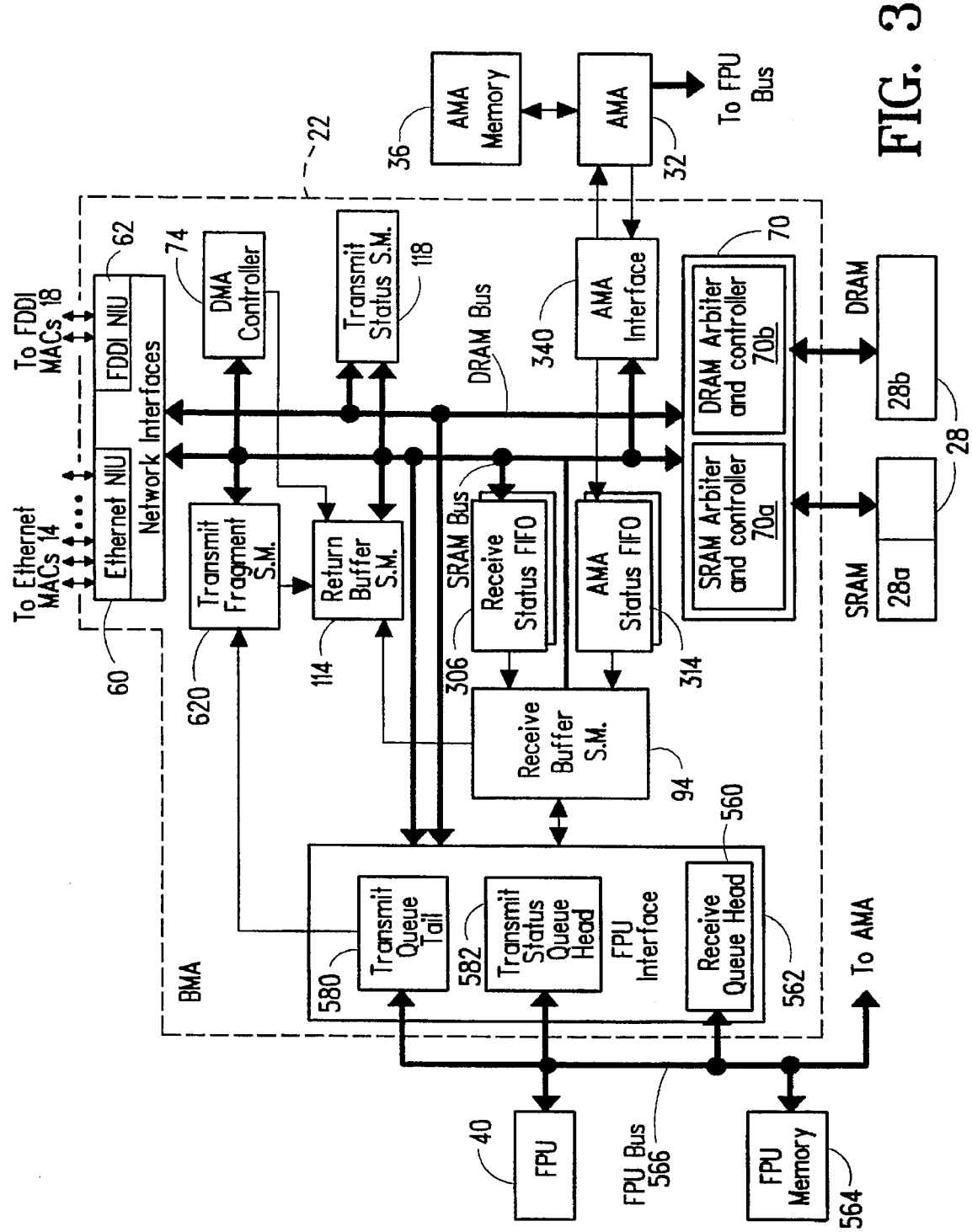
FIG. 3 is a further block diagram of the device of FIG. 1 showing an embodiment of the BMA in greater detail.

Referring to FIG. 3, a packet 46 received at a MAC 14, 18 from a source network is then passed to an associated Network Interface Unit (NIU) 60, 62, respectively. The Ethernet or FDDI NIU 60, 62 sends a request for memory access to a Direct Memory Access (DMA) controller 74. The DMA controller 74 channels the request to one of two arbiters and controllers 70a, 70b (forming an arbiter and controller pair 70) in accordance with whether the predetermined number of bytes to be stored in SRAM 28a have been received. The arbiter pair 70 includes an SRAM arbiter and controller 70a and a DRAM arbiter and controller 70b, each in communication with a respective portion 28a, 28b of memory 28. Each arbiter/controller 70a, 70b grants access to the respective portion of memory 28 and notifies both the DMA controller 74 and the receiving NIU 60, 62 of the grant. The DMA controller 74 provides an address identifying an available buffer in the memory 28 and causes the packet 46 to be transferred from the NIU 60, 62 into the specified buffer.

Figure 4A:
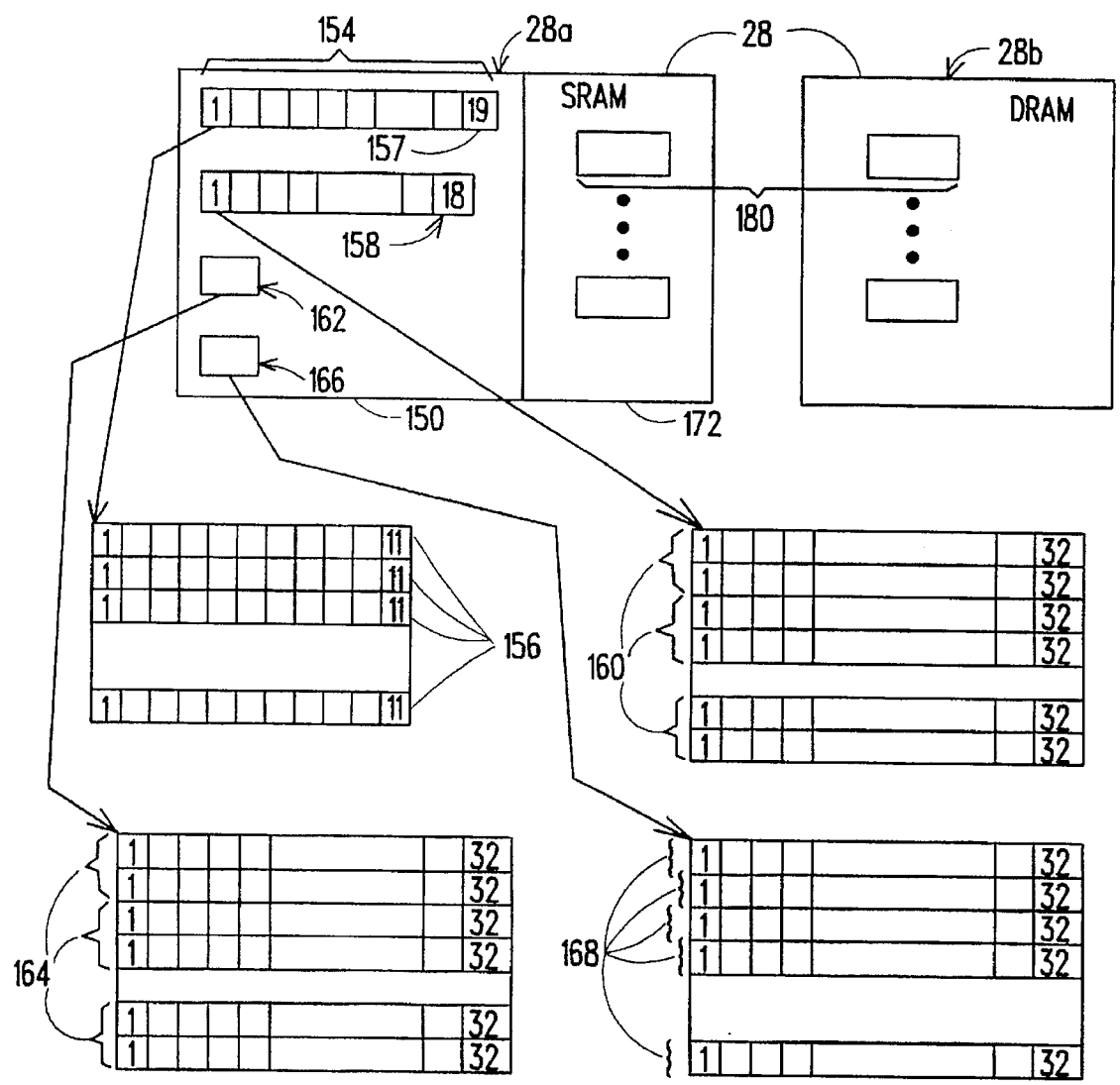
FIG. 4a shows an embodiment of the memory associated with the BMA in FIG. 3.

Referring also to FIG. 4a, the memory 28 includes an SRAM portion 28a and a DRAM portion 28b, as mentioned above. In one embodiment, the size of the SRAM portion 28a is 512 KB and the size of the DRAM portion 28b is 4 MB. Not all of the 4 MB DRAM portion is used however, since in the present embodiment the addresses of the SRAM are interleaved with addresses of the DRAM, as described below in conjunction with FIG. 4b. The SRAM 28a is divided into a control portion 150, including thirty-nine circular Queues 154, 157, 158, 162 and 166, and a buffer portion 172. The buffer portion 172 of SRAM 28a and the DRAM 28b provide buffers 180, some of which are assigned at system initialization to the MACs 14, 18. In one embodiment, the buffer portion 172 and DRAM 28b are divided into 2048 buffers 180.

Figure 4B:
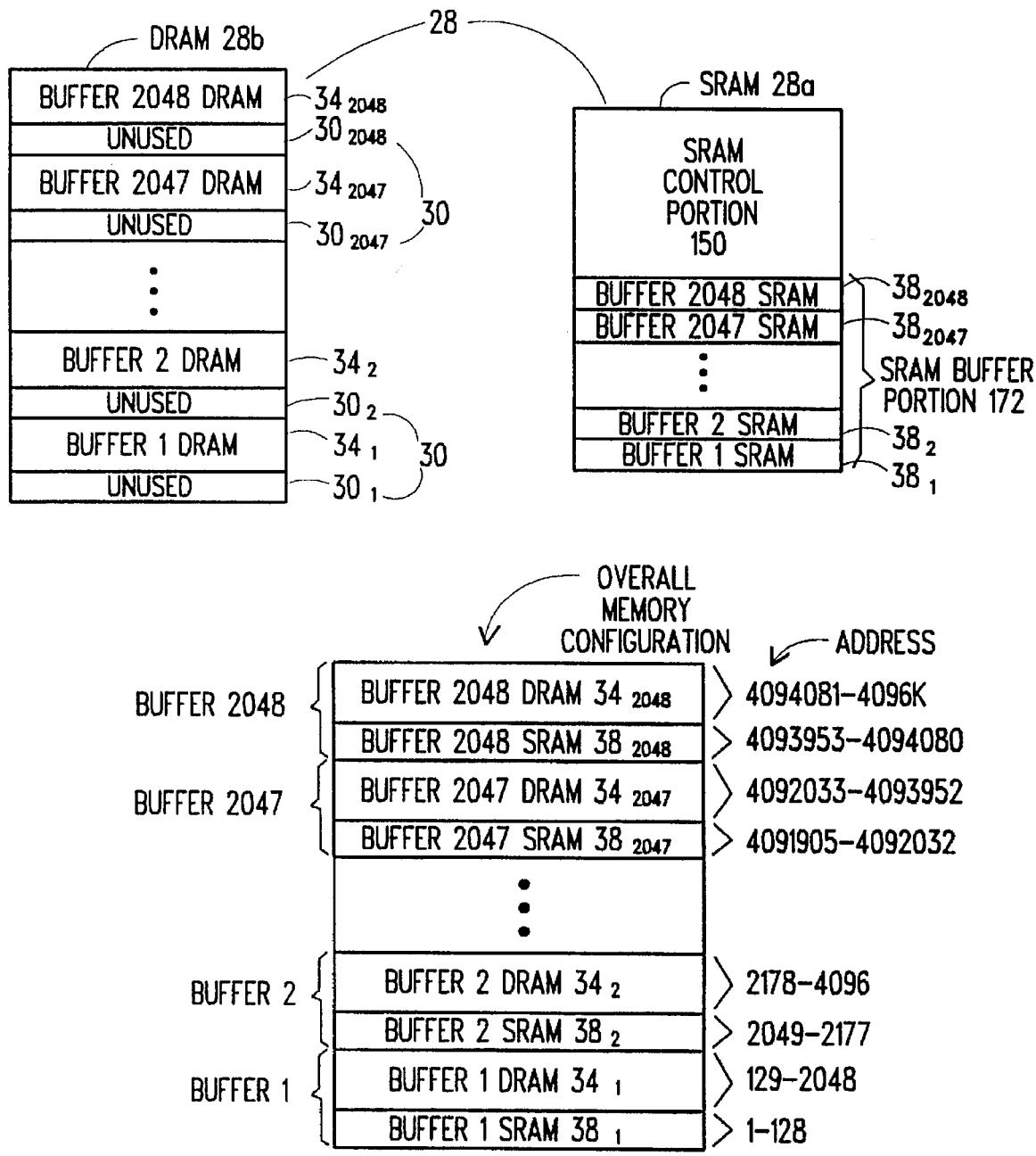
FIG. 4b shows the configuration of the individual SRAM and DRAM memory portions and the overall memory configuration interleaving portions of SRAM and DRAM.

Referring also to FIG. 4b, the configuration of SRAM and DRAM portions 28a, 28b of memory 28 are shown. As is apparent from the view of DRAM 28b in FIG. 4b, unused buffer portions $30_1$–$30_{2048}$ are interleaved with portions of DRAM that make up the buffers 180. Specifically, each unused DRAM portion $30_1$–$30_{2048}$ is 128 bytes in length and logically precedes a portion of DRAM $34_1$–$34_{2048}$ dedicated to a buffer. For example, the first unused block $30_1$ of DRAM precedes a portion $34_1$ of DRAM, with the portion $34_1$ providing the DRAM of the first buffer. Similarly, the last unused block $30_{2048}$ of DRAM precedes a portion $34_{2048}$ of DRAM associated with buffer number 2048. The buffer portion 172 of SRAM 28a is divided into 2048 blocks $38_1$–$38_{2048}$, each 128 bytes long and associated with a respective one of the 2048 buffers.

Also shown in FIG. 4b is the overall memory configuration achieved by interleaving addresses of the SRAM portion 28a with addresses of the DRAM portion 28b. More particularly, the overall memory configuration has sequential addresses, which correspond to blocks of SRAM 28a interleaved with blocks of DRAM 28b. In the illustrative embodiment, the first 128 bytes of memory, at addresses 1–128, correspond to the first 128 bytes of the SRAM buffer portion 172 (i.e., portion $38_1$). The second block of memory, from addresses 129–2048, corresponds to the DRAM buffer portion $34_1$. Together the SRAM portion $38_1$ and the DRAM portion $34_1$ provide buffer 1. The SRAM and DRAM portions $38_1$–$38_{2048}$, $34_1$–$34_{2048}$ are interleaved in this manner to provide buffers 1 through 2048, as shown in the overall memory configuration of FIG. 4b.

At system initialization, a predetermined number of buffers are assigned to each MAC 14, 18 under program control in a manner described below. Specifically, in one embodiment 64 buffers are assigned to each MAC 14, 18. The remaining buffers 180 are assigned to a common pool of buffers which may be used in the event a MAC 14, 18 has used all of its preassigned buffers. A portion of this common pool can be reserved for use by the FPU 40. In one embodiment, the distribution of such buffers is determined at initialization. In another embodiment of the present invention, the distribution of such buffers between MACs 14, 18 and the common pool of buffers is adjusted actively according to measured network activity. Both are described in greater detail in the co-pending patent application entitled "Method and Apparatus for Internetwork Buffer Management" (Attorney Docket No. SYNER-107XX) filed on even date herewith and assigned to the assignee of the present invention and incorporated herein by reference.

Each buffer 180 includes locations in buffer portion 172 of SRAM 28a and locations in DRAM 28b, as will be discussed below in conjunction with FIG. 6. The packets 46 are stored in buffers 180 so as to ensure that, in cases where it is necessary for the memory 28 to be accessed for purposes of header translation, it is the SRAM portion 172 of the buffer 180 that is accessed. Since SRAM has shorter access times than DRAM, requiring memory accesses to be to SRAM advantageously reduces header translation time.

Referring to the control portion 150 of the SRAM 28a, nineteen of the thirty-nine circular queues are referred to as Free Buffer Queues (generally labelled 154, 157); eighteen of the queues are Transmit Queues (generally labelled 158); one queue is a Receive Queue 162 and one queue is a Transmit Status Queue 166 containing transmit status information provided by a Transmit Status State Machine (TSSM) 118 in the BMA 22 shown in FIG. 3.

Each of the Free Buffer Queues 154, 157 contains a list of unused buffers 180. The first eighteen Free Buffer Queues 154 correspond to the eighteen MACs 14, 18 and contain lists of buffers 180 available only to the respective MAC 14, 18. In the illustrative embodiment in which each of the MACs initially has sixty-four unused dedicated buffers, each of the Free Buffer Queues 154 contains sixty-four entries 156. The Free Buffer Queue entries 156 contain the eleven bit address of the respective buffer 180 in memory 28. In the same illustrative embodiment, the eleven bit entries enable addressing 2048 buffers. The nineteenth Free Buffer Queue 157 is a common Free Buffer Queue which lists buffers which may be used by any of the MACs 14, 18 in the event that the supply of buffers originally assigned to the per port Free Buffer Queues 154 is exhausted.

Each of the eighteen Transmit Queues 158 is associated with a corresponding one of the MACs 14, 18 and contains entries corresponding to packet transmissions enqueued by the FPU 40 for processing by the respective MAC 14, 18. More particularly, the Transmit Queues 158 are configurable to between 0 and 1500 entries deep, with each entry 160 comprising two, thirty-two bit words, as shown. In one embodiment, each Transmit Queue 158 is 500 entries deep. The content of the transmit entries 160 will be described further in conjunction with FIGS. 14a and 14b.

The Receive Queue 162 contains entries 164 corresponding to packets 46 received by the device 10 for processing by the FPU 40. The Receive Queue 162 is configurable to between 0 and 4096 entries deep, with each entry 164 comprising two, thirty-two bit words. In one embodiment, the Receive Queue 162 is 4096 entries deep. The format of the Receive Queue entries 164 will be described below in conjunction with FIGS. 12a and 12b.

The Transmit Status Queue 166 contains an entry 168 for each packet 46 that has been transmitted from the internetworking device 10 in error. More particularly, the transmit status entries 168 indicate which error(s) occurred in the transmission of the corresponding packet 46 from the device 10. The Transmit Status Queue 166 is configurable to between 0 and 4096 entries deep, and, in one embodiment is 2048 entries deep, with each entry 168 being one, thirty-two bit word.

Figure 5:
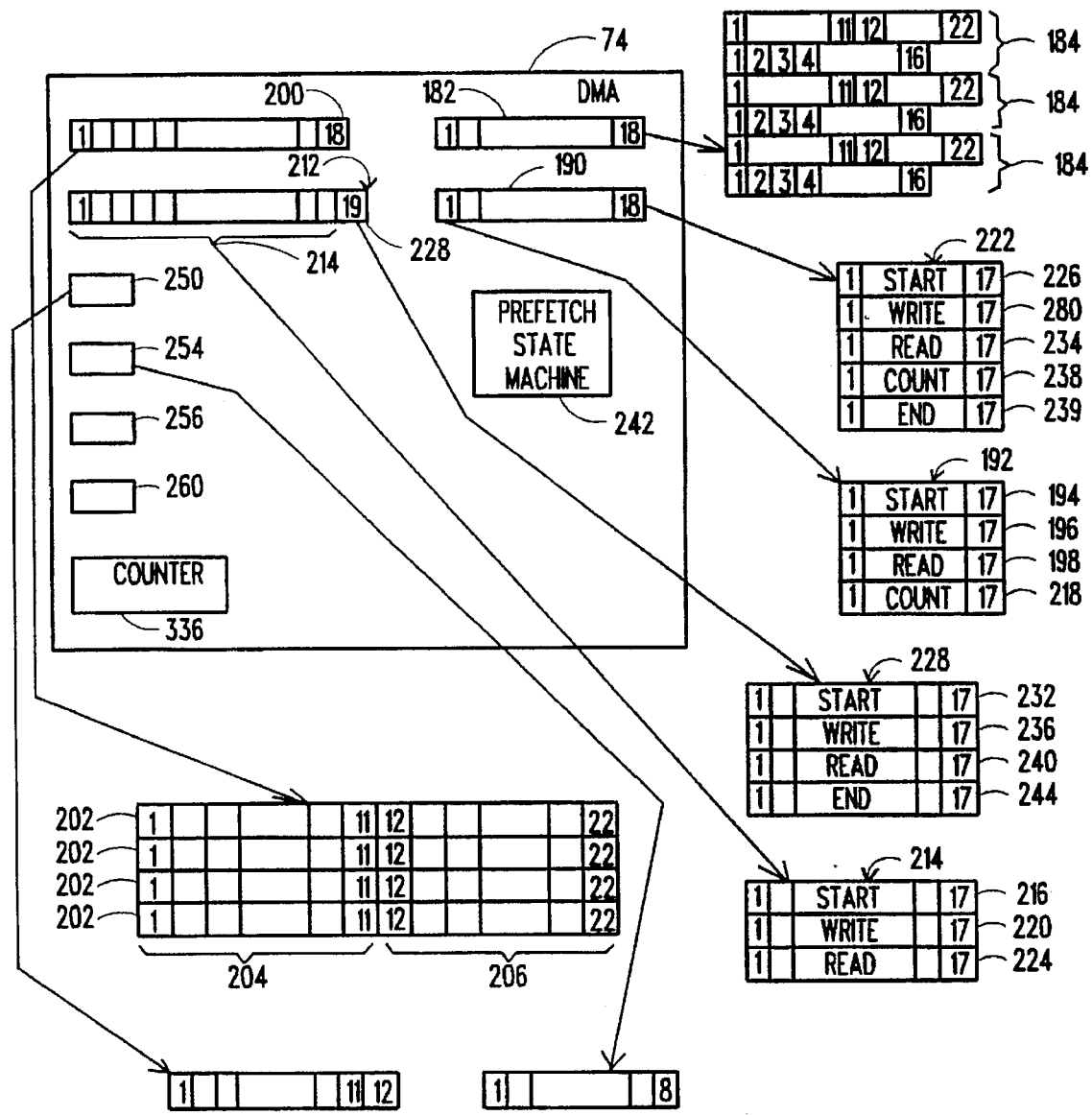
FIG. 5 shows the DMA controller of FIG. 3 in greater detail.

Referring also to FIG. 5, the DMA controller 74 includes eighteen Free Buffer Prefetch Queues 200, corresponding to the eighteen MACs 14, 18. Each queue contains four prefetch entries 202 received from a respective Free Buffer Queue 154 in memory 28. More particularly, the Prefetch Queue entries 202 include the address of buffers available to the respective MAC 14, 18, as will be described. With this arrangement, the DMA controller 74 is able to allocate an incoming packet 46 to a buffer 180 quickly, without having to access the respective Free Buffer Queue 154 in the SRAM control portion 150 (FIG. 4a). Each entry 202 of the Free Buffer Prefetch Queues 200 is twenty-two bits long, with the first eleven bits 204 providing the address of the available buffer and the second eleven bits 206 providing a body offset pointer (i.e., a pointer to the buffer location following the gap). The first eleven bits 204 are taken from the respective Free Buffer Queue 154, and the second eleven bits 206 are taken from a Body Offset Register 260 of the DMA controller 74 (discussed below).

The DMA controller 74 further contains nineteen Free Buffer Queue Control Blocks (QCBs) 212. Each of the nineteen QCBs 212 corresponds to one of the nineteen Free Buffer Queues 154, 157 (FIG. 4a) in the SRAM control portion 150. The QCBs 212 maintain pointers to the Free Buffer Queues 154, 157, with one of the pointers indicating the next available buffer 180 in the respective queue 154, 157 for storing incoming packets 46. Thus, when one of the entries 202 in a Free Buffer Prefetch Queue 200 is used (i.e., is assigned to store an incoming packet 46), the DMA controller 74 prefetches the address of the next available buffer within the respective Free Buffer Queue 154 based upon the current pointers in the respective QCB 212. Alternatively, if there are no available buffers remaining in the respective Free Buffer Queue 154, then the DMA controller 74 prefetches the next available buffer within the common Free Buffer Queue 157. Then, the DMA controller 74 adjusts the pointers in that QCB 212 to reflect the use of the prefetched buffer.

To this end, each of the first eighteen Free Buffer QCBs 214 contains three pointers, a START pointer 216, a WRITE pointer 220, and a READ pointer 224. The nineteenth Free Buffer QCB 228 contains four pointers, a START pointer 232, a WRITE pointer 236, a READ pointer 240, and an END pointer 244. Each of the pointers in the QCBs 212 is seventeen bits long, corresponding to an address in the control portion of SRAM where the Free Buffer Queue 154, 157 resides. While the first eighteen QCBs 214 do not contain END pointers 244, the function of the END pointer 244 (i.e., to indicate when the WRITE pointer 236 and the READ pointer 240 are to loop back to the head of the respective Free Buffer Queue) is provided by the START pointer 216 of the next sequential QCB 214, 228.

At initialization, the START pointer 216, 232 and the WRITE pointer 220, 236 of each QCB 214, 228, respectively, point to the first location in the respective Free Buffer Queue 154, 157, which after initialization contains the address of the first buffer associated with the respective port. The READ pointer 224, 240 indicates the location preceding the location at which the address of the next buffer to be returned after use is written. The END pointer 244, in the nineteenth QCB 228, points to the last buffer in the common Free Buffer Queue 157.

The START pointer 216, 232 is fixed at the first entry in the respective Free Buffer Queue 154, 157. The WRITE pointer 220, 236 is incremented during operation, as buffers in the Free Buffer Queues 154, 157 are assigned to incoming packets 46. The READ pointer 224, 240 is incremented during operation as buffers are returned to their respective Free Buffer Queues 154, 157 after use. The END pointer 244 is fixed at the last buffer in the common Free Buffer Queue 157.

When the WRITE pointer 220, 236 points to the same location as the END pointer 244 (or equivalently, the START pointer 216 of the next sequential QCB 214), the WRITE pointer 220, 236 is incremented to the location of the fixed START pointer 216, 232, so as to cause the WRITE pointer 220, 236 to "loop back" to the beginning of the buffer list, thereby treating this list as a circular queue. Likewise, when the READ pointer 224, 240 points to the same location as the END pointer 244 (or to the START pointer 216 of the next sequential QCB 214, 228), the READ pointer 224, 240 is incremented to the location of the fixed START pointer 216, 232, causing the READ pointer 224, 240 to "loop back" to the beginning of the buffer list.

The transmission components of the DMA controller 74 somewhat mirror the buffer allocation components in that, the DMA controller 74 contains eighteen Transmit Prefetch Queues 182, corresponding to the eighteen MACs 14, 18. Each Transmit Prefetch Queue 182 contains three entries 184. A Transmit Prefetch Queue entry 184 consists of a twenty-two bit buffer address and a sixteen bit control and length word. The control and length word consists of three control bits and a thirteen bit packet length field. The control bits indicate "cut-through", "end of frame" and "do not free buffer", which are described below. The two words of each Transmit Prefetch Queue entry 184 correspond to an entry 160 (FIGS. 14a and 14b) in a Transmit Queue 158.

The DMA controller 74 additionally includes eighteen Transmit QCBs 190, each likewise corresponding to one of the eighteen MACs 14, 18. The first seventeen Transmit QCBs 192 contain a COUNT field 218 and three pointers: a START pointer 194, a WRITE pointer 196, and a READ pointer 198. The START, WRITE, and READ pointers are as described above in conjunction with the Free Buffer QCBs 212. The COUNT field 218 maintains a count of transmitted Transmit Queue entries 184. The last Transmit QCB 222 contains five pointers: a START pointer 226, a WRITE pointer 280, a READ pointer 234, a COUNT pointer 238 and an END pointer 239. The END pointer 239 functions as described above in conjunction with the nineteenth Free Buffer QCB 228. Each Transmit QCB pointer is seventeen bits long, corresponding to an address in the control portion of SRAM where the Transmit Queue 158 resides.

When a Free Buffer Prefetch Queue 200 contains less than four entries 202, a Prefetch State Machine 242 prefetches the address of the next available buffer within the respective Free Buffer Queue 154, 157 in response to the pointers in the Free Buffer QCBs 212. Similarly, when a Transmit Queue 182 contains less than three entries 184, the Prefetch State Machine 242 prefetches the next entry within the respective Transmit Queue 158 in response to the Transmit QCBs 190.

In operation and considering illustrative Free Buffer QCB 214, initially, the START and WRITE pointers 216, 220 point to the first location of the respective Free Buffer Queue 154 and the READ pointer 224 points to the last entry in the respective Free Buffer Queue 154. When the associated Free Buffer Prefetch Queue 200 becomes not full, the DMA controller 74 reads the address of the buffer pointed to by the WRITE pointer 220 and writes it into the next available location in the Free Buffer Prefetch Queue 200. Thereafter, the WRITE pointer is incremented by one.

Conversely, once use of a buffer is completed and the buffer is returned to the respective Free Buffer Queue 154, the address of the buffer to be returned is written into the location of the Free Buffer Queue 154 subsequent to the location pointed to by the READ pointer 224. Thereafter, the READ pointer 224 is incremented by one.

Recall that the Free Buffer Queues 154, 157 contain sixty-four entries 156. However, each of the Free Buffer Queues 154, 157 contains an additional location which is used to indicate whether the Free Buffer Queues 154, 157 are empty or full. When the WRITE pointer 220 and the READ pointer 224 are separated by one queue entry, then the respective Free Buffer Queue 154, 157 is full (i.e., no buffers have been used and all are available). When the WRITE pointer 220 points to the same location as the READ pointer 224, the respective Free Buffer Queue 154, 157 is empty (i.e., there are no more assigned buffers available for receiving incoming packets). When the Prefetch State Machine 242 attempts to "fetch" a buffer and determines that there are no more available buffers assigned to the respective MAC 14, 18, then the Prefetch State Machine looks to the last Free Buffer Prefetch QCB 228 associated with the common Free Buffer Queue 157 to fetch a buffer address.

The DMA controller 74 further includes two registers 250, 254 dedicated to allocating buffers 180 from memory 28 for use by the FPU 40 for network management purposes. The first such register is an FPU Available Buffer register 250 which includes the address of the next available buffer from the common Free Buffer Queue 157 for use by the FPU 40. The FPU Available Buffer register 250 is twelve bits wide. The first eleven bits are buffer address bits. The twelfth bit indicates whether the buffer address in the first eleven bits is available for use. The second such register is an FPU Buffer Reserve Count register 254 which specifies how many buffers 180 are reserved for use by the FPU 40. This number is initialized by the FPU 40.

A Header Offset Register 256 is provided in the DMA controller 74 for each buffer 180 and stores the first address in the respective buffer at which the destination address 54 of the packet header 48 is stored. Similarly, a Body Offset register 260 is provided in the DMA controller 74 for each buffer 180 and stores a pointer to the first location in the respective buffer after the header and gap.

An illustrative packet buffer 180 from one of the Free Buffer Queues 154, 157 is shown in FIG. 6 to have a length of 2048 bytes. The first 128 bytes of the buffer 180 are located in the buffer portion 172 of SRAM 28a (FIG. 4a) and provide an SRAM storage area 268 of the buffer 180, while the remaining 1920 bytes of the buffer 180 are located in the DRAM 28b and provide a DRAM storage area 332. A first predetermined number of bytes of the buffer 180 (i.e., the control storage area 270) are reserved for buffer control information, including a Buffer Owner field 274 and a Buffer Used Count field 278. In the illustrative embodiment, the control storage area 270 is seven bytes in length.

The Buffer Owner field 274 identifies the Free Buffer Queue 154, 157 in which the buffer 180 is listed. This field 274 is used in the releasing of the buffer 180 after the last transmission of a packet 46 contained therein. Upon initialization, an identifier is written into the Buffer Owner field 274, identifying which of the MACs 14, 18 is assigned the particular buffer 180. With this arrangement, when it is time to return the buffer 180, a Return Buffer State Machine 114 (FIG. 3) can associate the buffer 180 with a particular MAC 14, 18. A value of 0–17 in the Buffer Owner field 274 indicates that the buffer 180 is assigned to a Free Buffer Queue 154 associated with one of the MACs 14, 18. A Buffer Owner field 274 having the value of 255 indicates that the buffer 180 is assigned to the common Free Buffer Queue 157. Buffer Owner field values of 18–253 indicate that the packet buffer 180 is reserved for network port expansion. Finally, a Buffer Owner field 274 with a value of 254 indicates that the packet buffer 180 is permanently allocated to the FPU 40, and is never to be returned.

The Buffer Used Count field 278 is also used in the return of the buffer 180 after the last transmission of a packet stored therein and, specifically, indicates whether the buffer 180 should be returned for reuse. The Buffer Used Count field 278 contains a value indicating the number of times the buffer 180 is to be transmitted before the buffer is returned. The Buffer Used Count field 278 is used primarily for multicast transmissions, where data from a single buffer is transmitted by multiple ports before the buffer is returned, as described below in conjunction with FIG. 13.

The source 56 and destination 54 addresses of the packet header 48 are read into an address header storage area, including a destination address field 282 and a source address field 286 of the buffer 180. In the illustrative embodiment, the address header storage area contains twelve bytes, for storing the six bytes of destination address 54 and the six bytes of source address 56. A configurable header offset pointer 290, stored in the Header Offset Register 256 of the DMA controller 74, defines the starting location of the destination address field 282 within the buffer 180. Thus, the position of the destination 54 and source 56 addresses within the buffer 180 is always the same, regardless of packet type. The header offset pointer 290 is selected so as to leave a one byte location preceding the destination address field 282 (i.e. the FDDI frame control field 294) for storage of a frame control entry 57 (FIG. 2) associated with an FDDI packet 46'". Thus, in a buffer 180 assigned to an FDDI MAC 18, the frame control entry 57 is stored in the FDDI frame control field 294 preceding the destination address storage field 282.

A predetermined number of bytes of the SRAM storage area 268, following the source address field 286, are reserved for the translation gap 298. This gap 298 is reserved for the addition of translation bytes (i.e., bytes which may be overwritten by the FPU 40 for the purpose of translating the packet 46 from one network format to another). This reserved space within the buffer 180 permits the FPU 40 to perform translation without having to relocate or move either the packet header 48 or data 50 within the buffer 180. In the present embodiment, the translation gap 298 is twenty-four bytes in length.

Figure 9A:
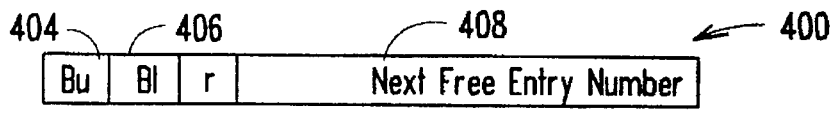
FIGS. 9a and 9b depict an illustrative data format for the AMA Status FIFO.
Figure 9B:
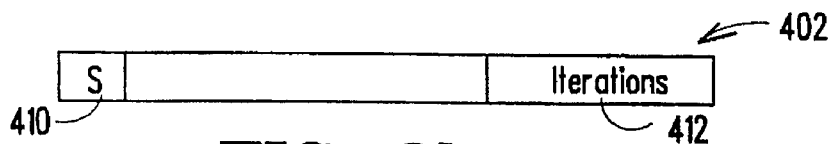
Figure 10A:
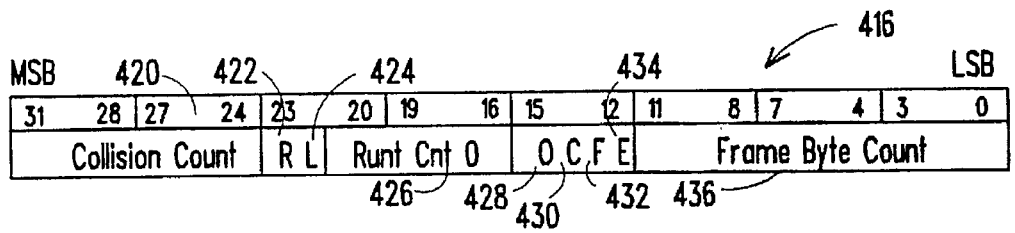
FIGS. 10a and 10b show an illustrative data format for the Receive Status FIFO (for both the Ethernet and FDDI networks)
Figure 10B:
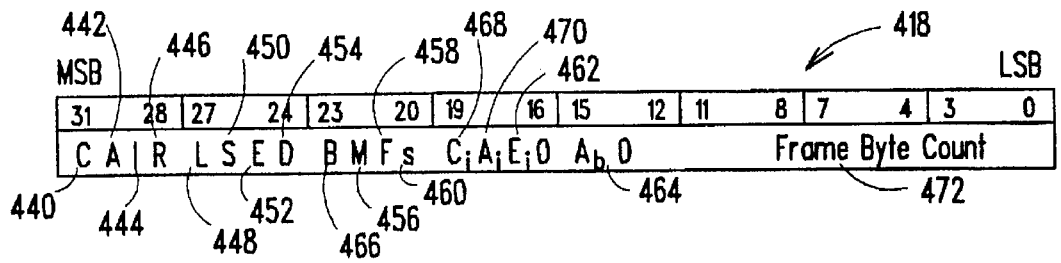

Receive status, provided by a Receive Status FIFO 306 (FIG. 3) and described below in conjunction with FIGS. 10a and 10b, is temporarily stored in a receive status field 310 of the buffer 180, within the translation gap 298. Information provided by an AMA Status FIFO 314 and described below in conjunction with FIGS. 7-9b, is stored in an AMA field 318 of the buffer 180, immediately following the receive status field 310.

A configurable body offset pointer 320 stored in the Body Offset Register 260 in the DMA controller 74 points to a predetermined number of words beyond the AMA field 318. In the buffer 180 shown, the body offset pointer 320 is spaced from the end of the AMA field 318 by four bytes.

The remainder of the received packet 46, including the data 50, is stored starting in the remainder of the SRAM portion 172, referred to as the after gap storage area 328. If the packet 46 requires more than the eighty-four bytes available in the after gap storage area 328, the remainder of the packet 46 is read into the DRAM storage area 332 of the buffer 180 located in the DRAM portion 28b of memory 28.

Upon receiving a packet 46, the DMA controller 74 assigns a buffer 180 to the received packet 46 from the respective Free Buffer Prefetch Queue 200 (FIG. 5). Thereafter, the destination 54 and source 56 addresses of the packet header 48 are written into the destination address field 282 and the source address field 286 of the buffer 180, beginning at the header offset pointer 290. A counter 336 located in the DMA controller 74 (FIG. 5) counts the first twelve bytes of the received packet in the case of an Ethernet source node or the first thirteen bytes in the case of an FDDI source node, based upon the type of port (FDDI or Ethernet) receiving the packet 46.

Once the appropriate count occurs, the DMA controller 74 increments the address in the SRAM storage area 268 to which the packet 46 is being transferred to the body offset pointer 320. In the illustrative embodiment, the SRAM address is incremented by twenty-four bytes, corresponding to an eight byte space 299, the four byte receive status field 310, the eight byte AMA field 318, and a four byte space 324. The remainder of the packet 46 is then written into the buffer 180 starting at the body offset pointer 320. If the packet 46 exceeds the eighty-four bytes available in the after gap storage area 328, then the remainder of the packet 46 is written into the DRAM storage area 332.

The twelve bytes of the received packet 46, which include the source 56 and destination 54 addresses for the packet 46, are written not only to the buffer 180 as described above, but also through an AMA interface 340 (FIG. 3) to the AMA 32. While the packet 46 is being stored in memory 28, the AMA 32 searches the address table in the AMA memory 36 for the source 56 and destination 54 addresses contained in the packet 46.

The FPU 40 issues commands to the AMA 32 and receives command results from the AMA 32 through a direct processor interface. The AMA's response to the FPU's command is reported to the FPU 40 in two, sixteen bit words 400, 402 (FIGS. 9a and 9b). The highest order bit (Bu) 404 of the first word 400 (FIG. 9a) indicates whether the AMA 32 is presently busy and is executing the last issued command. Bit 14 (BI) 406 indicates that the AMA 32 is currently blocked and is copying command data in preparation for executing a command. Bits twelve through zero 408 are the address of the next free entry 344 in the AMA memory 36.

The highest order bit (S) 410 of the second word 402 (FIG. 9b) returns the status result of the last command executed by the AMA 32. Whether the bit is set or cleared depends upon the command executed. Bits three through zero 412 specify the maximum number of search iterations which can be performed by the AMA 32 before an error condition is generated. The remaining bits are unspecified.

Figure 7:
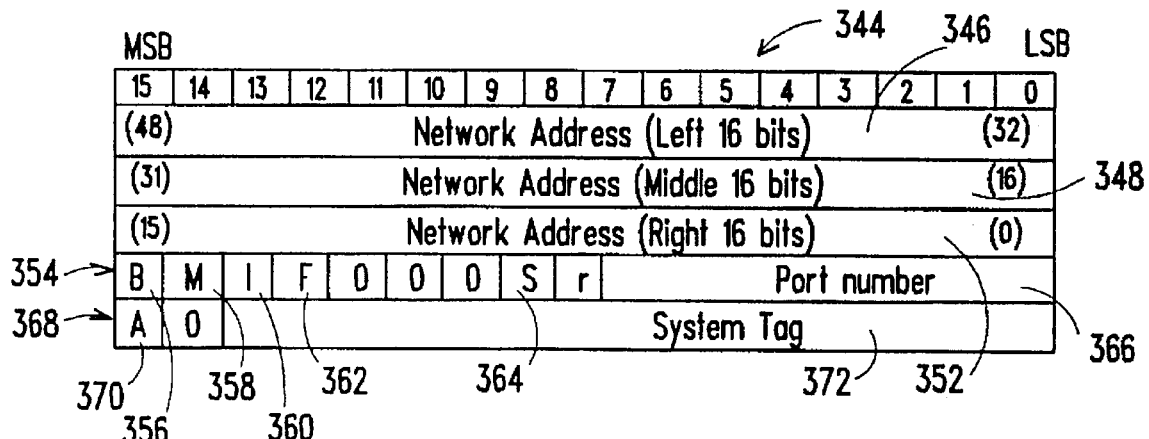
FIG. 7 shows an embodiment of an entry in AMA memory.
Figure 8A:
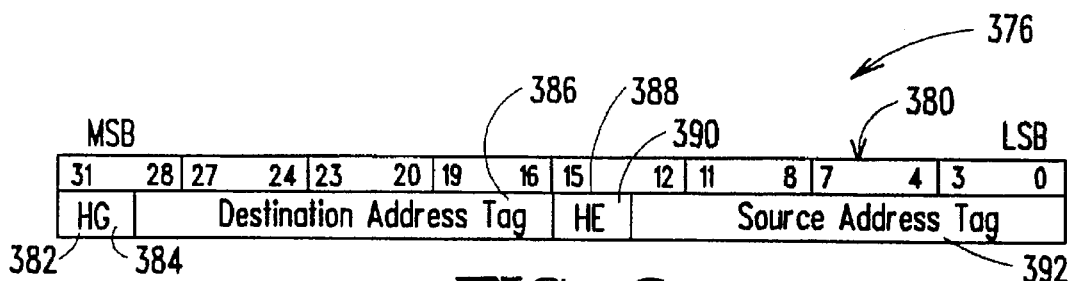
FIGS. 8a and 8b depict an embodiment of AMA status words.
Figure 8B:
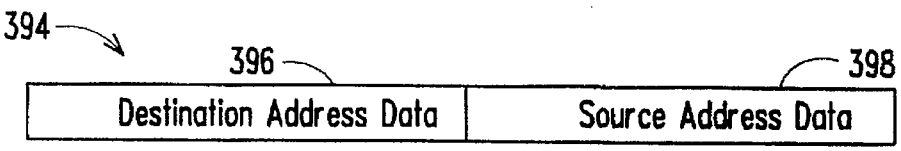

The form of the address table in the AMA memory 36 is shown in FIG. 7. Each entry 344 in the table corresponds to a node known to the AMA 32. The 48 bits of the network address of each node known to the AMA 32 are stored as three, sixteen bit shortwords 346, 348 and 352 beginning each table entry 344. A fourth shortword 354 of the table entry 344 provides various flags and a port number for this particular address. A fifth shortword 368 provides aging information and a system tag.

Specifically, the highest order bit in the fourth shortword 354, designated (B) 356 indicates that this network address is a broadcast address. The next highest bit, designated (M) 358 indicates that this network address is a multicast address. Bit 13, the internal bit (I) 360 indicates that this address belongs to the receiving MAC. If a frame belongs to a receiving MAC, it is either a frame to be routed or a network management frame. Bit 12, the (F) bit 362 indicates that the node's address is associated with an address filter. Filters are used to filter out (i.e., not forward) frames that meet certain criteria. Filters are configurable and the FPU 40 makes filtering decisions on a per frame basis. Bit 8, the static bit (S) 364 indicates that the address is static and was entered by a system manager, rather than being dynamic or learned by the system through packet transfers. Bits six through zero 366 designate the MAC 14, 18 associated with the node having the specified address. All remaining bits are unspecified or reserved.

The fifth shortword 368 of the entry 344 contains fifteen bits, an aging bit (A) 370 and fourteen bits 372 providing a system tag. The aging bit 370 is set whenever the source address 56 of the received packet 46 matches the address entry in the table. The aging bit 370 is periodically cleared by the FPU 40 and, if the bit is not set within a predetermined amount of time, the node address is cleared from the AMA memory 36. Addresses designated as static, by the setting of the static bit 364 (S), cannot be aged from the table. Bits thirteen through zero 372 provide a system tag which is a logical address to the AMA table (as opposed to a physical address). More particularly, a table of logical addresses to the AMA entries is maintained in the FPU's memory 40. This table maintains certain information about the ports, such as filtering information. The reason that the logical address system tag 372 is fourteen bits long (as opposed to the thirteen bits necessary to address each location of the AMA table) is to prevent two AMA table physical addresses from being given the same logical address while the table is being updated, i.e., during the period when one entry is being purged and another added. The remaining bit, bit 14, is unused.

Once the AMA 32 has completed the search of the address table in the AMA memory 36, it returns the information retrieved from the table to the BMA 22 through the AMA interface 340. A Receive Buffer State Machine (RBSM) 94 of the BMA 22 processes this data from the AMA 32 and formats it into two, thirty-two bit words, termed AMA status words 376 shown in FIGS. 8a and 8b. Bit 31 (H) 382 of the first word 380 (FIG. 8a) is a destination hit bit indicating that the packet's destination address 54 was located in the AMA table of addresses. Bit 30 is the group bit (G) 384 indicating that destination address 54 is either a broadcast or a multicast address. Bits twenty-nine through sixteen 386 form a 14 bit identifier used to identify, to the FPU 40, the entry 344 corresponding to the destination address 54. Similarly, bit fifteen is a source hit bit (H) 388 indicating that the packer's source address 56 was located in the AMA table of addresses. Bit fourteen (E) 390 indicates that the port upon which the source address 56 was received is different from the port upon which this address was last learned. Bits thirteen through zero 392 form a fourteen bit identifier used to identify the source memory entry to the FPU 40.

The first 16 bits of the second word 394 (FIG. 8b) contain data 396 associated with the destination node, such as the port through which the node with the destination address 54 can be accessed. The last 16 bits contain data 396 associated with the source address including the port upon which the packet is received.

When a packet 46 has been completely received by the BMA 22, the receive status indicated by the MAC 14, 18 is stored in the Receive Status FIFO 306 associated with the MAC 14, 18. The format of entries 416, 418 in the Receive Status FIFO 306 is shown in FIGS. 10a and 10b for the Ethernet and FDDI networks, respectively.

Specifically, the format for an entry 416 (FIG. 10a) in the Receive Status FIFO 306 associated with an Ethernet network is thirty-two bits long and utilizes bits 31 through 24 as a counter 420 indicating the number of collisions detected on the network since the last successfully received packet 46. Bits 23 and 22 (labelled 422 and 424 respectively) are error condition bits indicating that the packet 46 was too short (a runt frame) or too long, respectively. Bits 21 through 17 define a counter 426 which indicates the number of runt frames received since the last successfully received packet. Bits 15 through 12 are error bits which indicate typical Ethernet error conditions, such as: an overrun (O) 428 of a receive FIFO in the Ethernet MAC 14; a collision (C) 430; a framing error (F) 432; or a Frame Check Sequence (FCS) (E) 434. Bits eleven through zero 436 indicate the number of bytes in the received packet 46. Bit 16 is unspecified.

Similarly, the format of an entry 418 (FIG. 10b) in the Receive Status FIFO 306 associated with an FDDI network is also thirty-two bits long. Bits 31 through 26 indicate that the received packet has characteristics as specified by the frame control entry 57 (FIG. 2). Specifically, bit 31 defines the synchronous class frame bit (C) 440; bit 30 defines the short MAC address frame bit (A) 442 (a received frame error condition); bit 29 is the implementer frame type bit (I) 444 as specified in the frame control field definition of the FDDI ANSI standard; bit 28 is the reserved frame type bit (R) 446; bit 27 is the LLC frame type bit (L) 448 and bit 26 is the SMT/MAC frame type bit (S) 450. Bits 444, 446, 448 and 450 define frame types within FDDI, of which only two (bits 448 and 450) are used for normal data traffic.

Bits 25, 24, 22 through 20, 17 and 15 indicate various receive frame errors. Specifically, bit 25 indicates a Frame Check Sequence (FCS) Error (E) 452; bit 24 indicates a data length error (D) 454; bit 22 indicates that a MAC Reset has been issued and is set as a result of a software or hardware reset, or internal errors (M) 456; bit 21 indicates a format error (non-DATA, IDLE or Ending Delimiter Symbol) (F) 458; and bit 20 indicates that an IDLE symbol was received while expecting part of a Protocol Data Unit (PDU) (usually indicating that the PDU was stripped by a previous node on the network) (s) 460; bit 17 (Ei) 462 indicates that the FDDI MAC 28 detected an error on receive and set an "E" bit in the outgoing frame (at the end of the FDDI frame); and bit 15 ($A_b$) 464 indicates that the received packet 46 was aborted.

Bit 23, the big frame bit (B) 466, indicates that the received packet 46 contained more than 4500 bytes. Bit 19, the ($C_i$) indication bit 468 indicates that a frame copied indication was detected, while bit 18, the ($A_i$) indication bit 470, indicates that an address recognized indication was detected. Finally, bits thirteen through zero 472 indicate the received frame byte count length, including the trailer 52. The remaining bits are unspecified.

Figure 11:
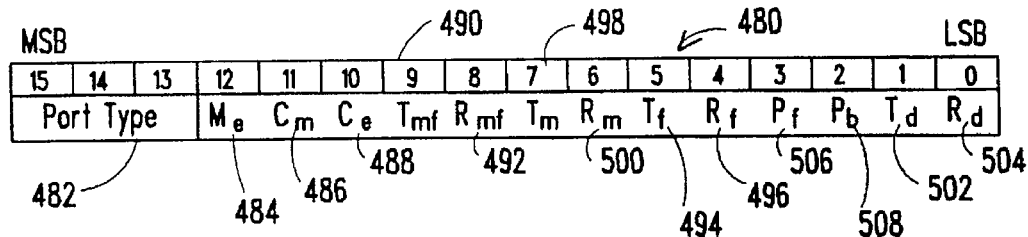
FIG. 11 shows an illustrative data format for the Port Status register of FIG. 3.

In addition to the Receive Status FIFO 306 (FIG. 3), Port Configuration registers 474 located in the RBSM 94 (not shown in FIG. 3) are also associated with each MAC 14, 18 and contain entries having a format shown in FIG. 11 indicating the current configuration for both the receive and transmit data communications paths associated with the MAC 14, 18. The illustrative Port Configuration register word 480 shown in FIG. 11 is sixteen bits long. Bits fifteen through thirteen 482 contain an indication of the type of MAC 14, 18 associated with the Port Configuration register 474. Bit 12, the monitor enable ($M_e$) bit 484 is set if the MAC 14, 18 is being monitored by a remote monitor. In such a case, all packets 46 received and transmitted by the MAC 14, 18 must also be sent to the monitor. Bit 11, the cut-through multicast enable bit ($C_m$) 486, indicates that multicast packets received or sent to this port may undergo cut-through. Similarly, Bit 10, the cut-through enable bit ($C_e$) 488, indicates that unicast packets received from and sent to this port may undergo cut-through. Bits 9, 8, 5 and 4 indicate that a user-defined filter that has been manually assigned to the port is enabled. Specifically, bit nine ($T_{mf}$) 490 indicates a transmit multicast path filter is enabled and should be applied to all multicast packets presented to this port for transmit; bit eight ($R_{mf}$) 492 indicates a receive multicast path filter is enabled and should be applied to all multicast packets received on this port to determine whether or not the multicast packet should be multicasted through the device 10; bit five ($T_f$) 494 indicates a transmit path filter is enabled and should be applied to all packets presented to this port for transmit; and bit four ($R_f$) 496 indicates a receive path filter is enabled and should be applied to all packets received on this port.

Bits 7, 6, 1, and 0 indicate that various paths for this port have been manually disabled at the MAC layer and that all packets presented on this port should be discarded. The setting of these bits causes packets to be discarded by the BMA 22, as contrasted to filtering by the FPU 40. Specifically, bit seven ($T_m$) 498 provides an indication for the transmit multicast path; bit six ($R_m$) 500 provides an indication for the receive multicast path; bit one ($T_d$) 502 provides an indication for the transmit path; and bit zero ($R_d$) 504 provides an indication for the receive path.

Bit three ($P_f$) 506 is used to indicate that the network port is not currently in a "bridge" forwarding state and is not allowed to forward frames. When bit 3 is set, the device 10 can learn addresses from this port, and it must receive and process all network management messages from other internetworking devices. Bit two ($P_b$) 508 is used to indicate that this network port is currently in a "bridge" blocking state and the device 10 is not allowed to forward packet 46 or learn network addresses received on this port, although the device 10 must still receive and process all application messages.

Referring to FIG. 3, the Receive Buffer State Machine (RBSM) 94 polls the Receive Status FIFO 306, the AMA Status FIFO 314 and the Port Configuration Registers 474 to determine how the received packet 46 should be handled. From this information the RBSM 94 generates a two long word Receive Queue entry 164, which includes a code vector and other information required by the FPU 40 in determining how to process the received packet 46.

Figure 12A:
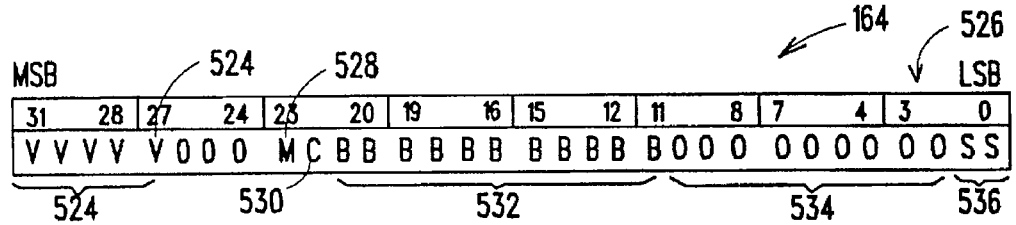
FIGS. 12a and 12b show an illustrative Receive Queue entry in a Receive Queue.
Figure 12B:
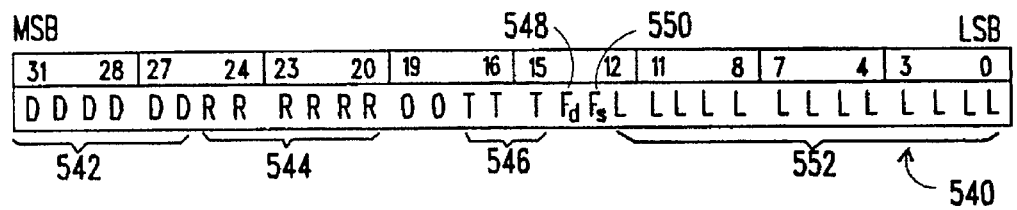

Referring to FIGS. 12a and 12b, the format of the Receive Queue entry 164 is shown. The five highest order bits thirty-one through twenty-seven 524 of the first word 526 (FIG. 12a) of the Receive Queue entry 164 define the code vector which indicates to the FPU 40 which software algorithm should be executed by the FPU 40. Bit twenty-three (M) 528 indicates that the buffer 180 associated with the packet 46 is part of a multi-buffer packet. Bit twenty-two (C) 530 indicates that the packet 46 should be handled as a cut-through packet. Bits twenty-one through eleven 532 indicate which buffer 180 contains the received packet 46. Bits ten through two 534 indicate the body offset pointer 320 (FIG. 6). Finally, bits one and zero 536 identify specific conditions associated with the source address of the received packet. The remaining bits are unspecified.

Bits thirty-one through twenty-six 542 of the second word 540 (FIG. 12b) of the Receive Queue entry 164, indicate the destination port of the received packet 46, as determined by the AMA 32. Bits twenty-five through twenty 544 indicate the port number on which the packet 46 was actually received. Bits seventeen through fifteen 546 provide a translation code, indicating the specific packet translation processing required to transmit the received packet information to a remote monitor. Bit fourteen ($F_d$) 548 is set if the destination address 54 was found in the AMA memory 36 and if a filter is enabled in the Port Configuration Register for the destination port. Bit thirteen ($F_s$) 550 is set if the source address 56 was found in the AMA memory 36 and if a filter is enabled in the Port Configuration Register for the source port. Finally, bits twelve through zero 552 specify the length (in bytes) of the received packet 46, exclusive of the trailer 52. The remaining bits are unspecified.

Since the packet length can only be known once an entire packet 46 is received, there is no way for a packet undergoing cut-through to have a valid length field entry 552. Thus, for cut-through packets, the length field 552 is set to zero.

The RBSM 94 (FIG. 3) transfers the Receive Queue entry 164 to the Receive Queue 162 located in the control portion 150 of SRAM 28a (FIG. 4a). The RBSM 94 copies entries 164 from the Receive queue 162 into a Receive Queue Head 560 located in an FPU interface 562. The Receive Queue Head 560 contains one entry that is two words long. The FPU 40 reads an entry from the Receive Queue Head 560 and executes an appropriate algorithm from the frame processor memory 564 in response to the code vector 524 and, if applicable, the translation code 546 contained in the Receive Queue entry 164 for that packet (FIG. 12a). When processing requires the FPU 40 to access the packet 46 in the buffer 180, a buffer pointer is used by the FPU 40 to retrieve packet data 50 from the buffer 180. The buffer pointer includes a field specifying the address of the BMA 22, a field specifying the buffer 180 to be accessed and a field specifying the type of buffer access. Illustrative types of buffer access are direct access, in which the FPU 40 reads data from a buffer 180 and processes such data, or request response access in which a read operation is requested, but the FPU bus 566 is available for other data transfer operations and reads the requested data from a register once the data is read from memory. Communication between the FPU 40, the frame processor memory 564, the BMA 22, and the AMA 32 is via the FPU Bus 566.

Once the FPU 40 has completed the algorithm invoked by the code vector 524, the FPU 40 enqueues, in a Transmit Queue Tail 580 (FIG. 3), a Transmit Queue entry 160. In one embodiment, the Transmit Queue Tail 580 can contain up to three entries, each two long words in length.

Figure 14A:
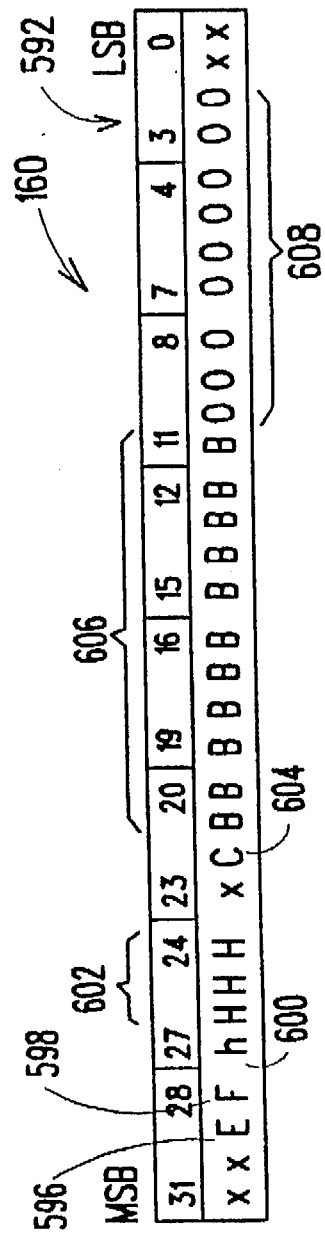
FIGS. 14a and 14b show an illustrative data format for a Transmit Queue entry in a Transmit Queue.
Figure 14B:
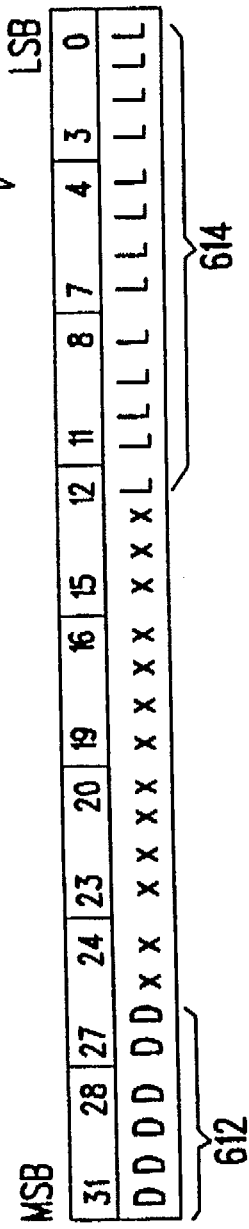

The Transmit Queue entry 160 defines the transmission parameters, as shown in FIGS. 14a and 14b, and includes two, thirty-two bit words 592, 594. Bit 29 (E) 596 of the first word 592 (FIG. 14a) is a "not end of frame" bit, which indicates that the data described by the Transmit Queue entry is part of a multi-fragment frame. Subsequent entries in the Transmit Queue Tail 580 define the remaining data for this packet. Bit 28 (F) 598 is a "do not free buffer" bit which is used by the DMA controller 74 to determine whether or not to return the buffer 180. Whether the packet buffer 180 is actually returned depends additionally upon the Buffer Used Count field 278 (FIG. 6), as described below in conjunction with FIG. 13. Bit 27 (h) 600 of the Transmit Queue entry 160 is a "do not prefix header" bit indicating whether or not to prefix the buffer contents starting at the body offset pointer 320 with the buffer contents starting at the header offset pointer 290. Bits twenty-six through twenty-four 602 define a header supplement length field indicating the number of additional bytes (written into the translation gap 298 by the FPU 40) to be transmitted with the buffer contents starting at the header offset pointer 290 as a result of frame translation. A header supplement length field value of zero indicates that no supplemental header bytes are to be transmitted. In cases where the "do not prefix header" bit 600 is set, the header supplement length field 602 is ignored, since the header portion in the buffer 180 is not to be transmitted.

Bit 22 (C) 604 is a cut-through frame bit indicating whether or not the internetworking device 10 is to begin re-transmitting the received packet 46 prior to the packet being completely received by the device. Bits twenty-one through eleven 606 define a transmit buffer number specifying the number of the buffer 180 containing the packet 46 to be transmitted, while bits ten through two 608 specify the body offset pointer 320. The remaining bits are unspecified.

Bits thirty-one through twenty-six 612 of the second word 594 (FIG. 14b) define a destination port field identifying to which of the eighteen MACs 14, 18 the transmission is to be sent. Bits twelve through zero 614 provide a packet length field specifying the number of bytes in the packet 46 to be transmitted. Note, however, the trailer portion 52 (FIG. 2) of the packet 46 is not included in the packet length field 614 since the trailer 52 is added by the transmitting MAC 14, 18. The remaining bits are unspecified.

Referring to FIG. 13, the operation of the Buffer Used Count field 278 (FIG. 6) and the "do not free buffer" bit 598 in the return of buffers 180 for re-use will be described in conjunction with illustrative buffers 180a, 180b and 180c. Buffers 180a and 180b contain an FDDI frame received by the BMA 22 in the manner described above. Initially, the FDDI header 48'" and a portion 960 of the received FDDI data 50'" are stored in buffer 180a. The remaining portion 978 of the received FDDI data 50'" is stored in the second buffer 180b, as shown. In the illustrative example, the received packet is intended for multicast transmission to all of the other MACs 14, 18. That is, the received FDDI data 50'" is intended for transmission to the non-receiving one of the two FDDI MACs 18 and to the sixteen Ethernet MACs 14. To this end, the Buffer Used Count field 278a, 278b of each buffer 180a, 180b, respectively, is initialized to a value of sixteen (i.e., the number of ports on which the data in the respective buffer is to be transmitted minus one), corresponding to transmission of the data contained in each of the buffers 180a, 180b by the seventeen other MACs. Buffer 180c contains Internet Protocol (IP) headers which are written during the header translation process and from which IP headers are taken when frames are fragmented for transmission, as described below. The Buffer Used Cont 278c associated with buffer 180c is initialized to a value of fifteen since the IP headers contained therein are used in the fragmented transmission of the received FDDI frame to the sixteen Ethernet MACs only (i.e., buffer 180c is not used in the transmission to the other FDDI MAC).

Also shown in FIG. 13 are selected fields with the Transmit Queue entries 160 associated with multicast transmission of the received FDDI packet. Specifically, the destination port/MAC and the buffer identifiers are depicted. Also shown in FIG. 13 are the "not end of frame" bit 596, the "do not free buffer" bit 598, and the "do not prefix header" bit 600. A "not end of frame" bit value of one indicates that the respective entry is not the last transmission of the particular frame. A "do not prefix header" bit value of one indicates that the address header stored in the respective buffer is not to be transmitted with the data specified by the respective Transmit Queue entry 160, because the packet is part of a multi-fragment frame and an IP header from buffer 180c is associated with that IP fragment transmission.

The "do not free buffer" bit 598 operates as an enable/disable bit for controlling the counter that decrements the Buffer Used Count 278. A "do not free buffer" bit value of one indicates that the buffer is not a candidate for return to the respective Free Buffer Queue 154, 157 and hence the Buffer Used Count 278 will not be decremented. If the "do not free buffer" bit 598 is zero, then the respective Buffer Used Count 278 may be decremented. The "do not free buffer" bit is zero when the buffer contents are being transmitted by the designated port (i.e., MAC) for the last time.

The first two entries in the Transmit Queue 158 correspond to transmission of the received FDDI packet to the non-receiving FDDI MAC 18. More particularly, the first entry corresponds to transmission of the data 960 from buffer 180a to the non-receiving FDDI MAC 18 and the second entry corresponds to transmission of the data 978 from buffer 180b to the non-receiving FDDI MAC 18.

In the first entry in the Transmit Queue 158, the "not end of frame" bit 596 is set, indicating that this transmission is not the end of the FDDI frame. The "do not free buffer" bit 598 on the other hand is zero, indicating that the contents of buffer 180a are being transmitted for the last time to the particular port, in this case, the non-receiving FDDI port. In response to the "not end of frame" bit 598 being zero, the Buffer Used Count 278a of the associated buffer 180a is decremented. Thus, after entry 1 in the Transmit Queue 158 is transmitted, the Buffer Used Count 278a is decremented to fifteen. Also, the "do not prefix header" bit 600 is zero indicating that the transmission of the data 960 of buffer 180a is to be prefixed with the header 48'" stored in buffer 180a.

In the second entry in the Transmit Queue 158 associated with transmission of data 978 from buffer 180b, the "not end of frame" bit 596 is zero, thereby indicating that this entry corresponds to the end of the particular frame. The "do not free buffer" bit 598 is also zero, indicating that the contents of buffer 180b are being transmitted for the last time by the non-receiving FDDI MAC 18. Thus, after entry 2 is transmitted, the Buffer Used Count field 278b associated with buffer 180b is decremented to a value of fifteen. The "do not prefix header" bit 600 is set, indicating that a header is not to be transmitted from buffer 180b.

Once the first and second Transmit Queue entries have been transmitted, the received FDDI packet is transmitted to a first one of the Ethernet MACs 14. The transmission of the received FDDI frame to the first Ethernet MAC 14 is accomplished by the transmission of two IP fragments, since the received FDDI frame is larger than a single Ethernet frame. A first IP frame fragment is transmitted to the first Ethernet MAC 14 by Transmit Queue entries 3, 4 and 5 and includes a first portion 970 of the data 960 stored in buffer 180a. A second IP frame fragment is transmitted to the first Ethernet MAC 14 by Transmit Queue entries 6, 7, 8 and 9 and contains the remainder 974 of the data 960 stored in buffer 180a, as well as the data 978 from buffer 180b.

Entry 3 begins the first IP frame fragment transmitted by the first Ethernet MAC 14 and more specifically corresponds to transmission of the address header stored in buffer 180a. More particularly, in entry 3, the "not end of frame" bit 596 is set, indicating that this transmission is not the last of the particular frame and the "do not prefix header" bit 600 is set indicating that the header stored in buffer 180a is not to be transmitted. The "do not free buffer" bit 598 is set in this case, thereby disabling the counter that decrements the Buffer Used Count 278a, since the contents of buffer 180a are not being transmitted to the first Ethernet MAC for the last time.

The fourth entry in Transmit Queue 158 corresponds to the transmission of the first fragment IP header from buffer 180c. The "not end of frame" bit 596 is set in entry 4, indicating that this transmission is not the last of the particular frame fragment. The "do not free buffer" frame 598 is set, thereby disabling the counter which decrements the Buffer Used Count 278c, since the contents of buffer 180c are not being transmitted by the first Ethernet MAC 14 for the last time. The "do not prefix header" frame 600 is also set, indicating that an address header from buffer 180c is not to be transmitted.

The transmission of the first IP frame fragment of the received FDDI frame by the first Ethernet MAC 14 is completed with the fifth entry, in which the "not end of frame" bit 596 is not set, indicating that entry 5 represents the end of the first IP frame fragment. The "do not free buffer" bit 598 is set, specifying that the contents of buffer 180a are being used for the last time for transmission by the first Ethernet MAC 14 and the "do not prefix header" bit 600 is set, indicating that no address header from buffer 180a is to be transmitted with entry 5.

Entry 6 begins the second IP frame fragment transmitted by the first Ethernet MAC 14 and more specifically corresponds to transmission of the address header stored in buffer 180a. To this end, the "not end of frame" bit 596 is set, since entry 6 does not represent the end of the particular frame fragment. Also, the "do not free buffer bit" 598 is set, thereby disabling the Buffer Used Count counter since buffer 180a is not being used for the last time by the first Ethernet MAC 14. Also, the "do not prefix header" bit 600 is set, preventing the address header 48'" stored in buffer 180a from being transmitted. Entry 7 corresponds to transmission of an IP header with this second IP frame fragment. Specifically, in entry 7, the "not end of frame" bit 596 is set since this entry is not the last of the particular IP frame fragment. The "do not free buffer" bit is not set, thereby enabling the counter that decrements the Buffer Used Count 278c associated with buffer 180c to decrement the count to fourteen, since buffer 180c is being used for the last time by the first Ethernet MAC. Also, the "do not prefix header" bit 600 is set, indicating that an address header from buffer 180c is not to be transmitted. Entry 8 corresponds to the transmission of the rest of the data 974 in buffer 180a. More particularly, in entry 8, the "not end of frame" bit 596 is set since this entry does not represent the last entry of the second IP frame fragment. The "do not free buffer" bit 598 is not set, causing the Buffer Used count 278a associated with buffer 180a to be decremented to fourteen, since buffer 180a is being used for the last time in the transmission by the first Ethernet MAC 14. The "do not prefix header" bit 600 is set, thereby preventing the address header 48''' stored in buffer 180a from being transmitted with the second IP frame fragment. Entry 9 corresponds to the transmission of the data 978 from buffer 180b and is the last entry associated with the second IP frame fragment transmitted by the first Ethernet MAC 14. Thus, the "not end of frame" bit 596 in entry 9 is not set, indicating the end of the frame fragment. The "do not free buffer" bit 598 is not set, thereby permitting the Buffer Used count 278b associated with buffer 180b to be decremented to fourteen, since this is the last time buffer 180b is used by the first Ethernet MAC.

Bits 596, 598 and 600 of entries 10, 11 and 12 are identical to like bits in entries 3, 4 and 5 and correspond to a first IP frame fragment of the received FDDI frame being transmitted by the second Ethernet MAC. Similarly, bits 596, 598 and 600 of entries 13, 14, 15 and 16 are identical to like bits in entries 6, 7, 8 and 9 and correspond to a second IP frame fragment of the received FDDI frame being transmitted by the second Ethernet MAC. In view of the above discussion, it will become apparent that the multicast transmission of the received FDDI packet requires ninety-eight additional entries in the Transmit Queue 158 which are not shown in FIG. 13 but which are identical to entries 3–9, albeit specifying the remaining fourteen Ethernet MACs.

The TFSM 620 transfers entries from the Transmit Queue Tail 580 into a Transmit Queue 158, located in the control portion 150 of the SRAM 28a, and associated with the destination MAC 14, 18. The Prefetch State Machine 242 of the DMA controller 74 polls each of the Transmit Prefetch Queues 182 to determine whether any such Queues 182 has an empty location. If any of the Transmit Prefetch Queues can accept another entry, then the Prefetch State Machine 242 polls the respective Transmit Queue 158 in accordance with the pointers stored in the respective Transmit QCB 190 and loads the next entry for transmission into the respective Transmit Prefetch Queue 182. Thereafter, the DMA controller 74 sends a request to one of the arbiters 70a, 70b for permission to access a buffer to transmit the contents thereof to the destination MAC 14, 18 associated with that queue entry. Upon the grant of such a request by the arbiter 70, the packet 46 is transmitted to the destination MAC 14, 18 under the control of the DMA controller 74.

Once the transmission is completed to the destination network, the transmitting MAC 14, 18 provides transmit status information to the TSSM 118 through the NIU 60, 62, including whether any transmission errors were encountered. Transmit status information may be monitored by the FPU 40 via a Transmit Status Queue Head 582 for statistical purposes. The Transmit Status Queue Head 582 works in similar fashion to the Receive Queue Head 560 in providing information to the FPU 40. In this case, only error transmit status from the TSSM 118 is made available to the FPU 40 via the Transmit Status Queue Head 582 for analysis.

After the data described by a Transmit Prefetch Queue entry has been transmitted by the DMA Controller 74, the DMA Controller checks to see if the "do not free" bit is set in that entry. If it is, then the DMA Controller 74 is done with this transmit operation. If the "do not free" bit is reset, then the DMA Controller 74 passes the buffer number from the Transmit Prefetch Queue entry to the Return Buffer State Machine 114. The Return Buffer State Machine 114 then uses this buffer number to read the Buffer Used Count field 278 of the transmitted buffer 180. If the Buffer Used Count is at a value of zero, then the buffer 180 is returned to the respective Free Buffer Queue 154, 157 for re-use.

Upon return, the buffer's address is stored in the Free Buffer Queue 154, 157 at the location subsequent to the location indicated by the READ pointer 224, 240. Subsequent increments of the WRITE pointer 220, 236 are permitted to point to the returned buffer 180, thereby permitting the returned buffer to be once again fetched by the DMA controller 74 for inclusion in the respective Free Buffer Prefetch Queue 200.

As discussed above, if the received packet 46 has a destination address 54 of a node on a network of the same type as the source network, and if certain other criteria are met, then the RBSM 94 does not wait for the Receive Status FIFO 306 information before enqueueing the Receive Queue entry 164 (FIGS. 12a and 12b). In such a case, the packet 46 is enqueued by the FPU 40 in the Transmit Queue Tail 580 prior to the packet 46 being completely received and stored in the buffer 180.

Alternatively, it may be determined by the RBSM 94 that a received packet should not be transmitted by the device 10. In this case, the RBSM 94 provides the buffer number to the Return Buffer state machine 114, and the previously described process for returning the packet receiving buffer 180 to the Free Buffer Queue 154, 157 is repeated.

In more detail, code vector generation occurs in the RBSM 94 portion of the BMA 22. Code vector generation begins with the RBSM 94 examining certain characteristics of the received data packet as indicated in the Receive Status FIFO 306 (for example whether the data packet has been damaged due to buffer overrun) and the AMA Status FIFO 314 (for example whether the source and destination addresses of the packet are known to the AMA 32) in addition to certain characteristics of the transmit and receive ports of the internetworking device as indicated by the Port Configuration Registers 474 (for example whether the port has filtering enabled).

From this information the RBSM 94 generates, within approximately 20 clock cycles, one of a predetermined number of code vectors (in one embodiment thirty two possible vectors) Table 1. The code vector instructs the FPU 40 as to which algorithm from FPU memory 564 the FPU 40 should execute in transmitting the data packet 46 to the correct network port.

By using hardware, in one embodiment an application specific integrated circuit (ASIC), to generate the code vector, a significant amount of time is saved over the previously used method of having the FPU 40 examine the FIFOs and registers and making such a determination in software. Using such a system permits data packets 46 which need minimal processing (such as cut-through frames) to be dealt with using limited algorithms. Conversely, data packets 46 requiring extensive processing (such as those requiring exception processing) can be dealt with by extensive exception routines. By permitting specific algorithms to match specific data packet requirements, the algorithms used by the internetworking device need no longer be exhaustive code paths, burdened by worst-case data packet contingencies.

Figure 15A:
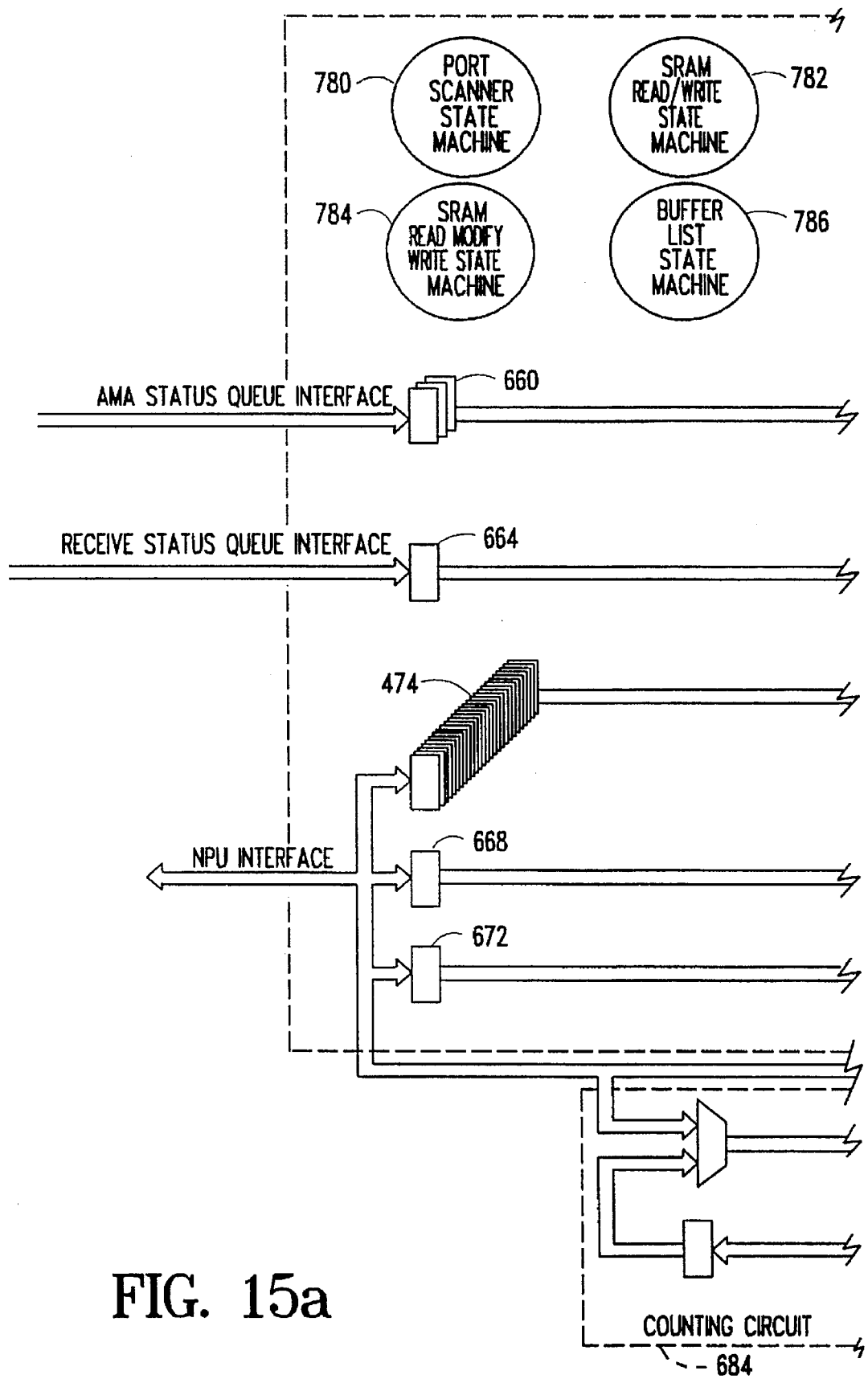
FIGS. 15a–c shows a detailed embodiment of the RBSM shown in FIG. 3.
Figure 15B:
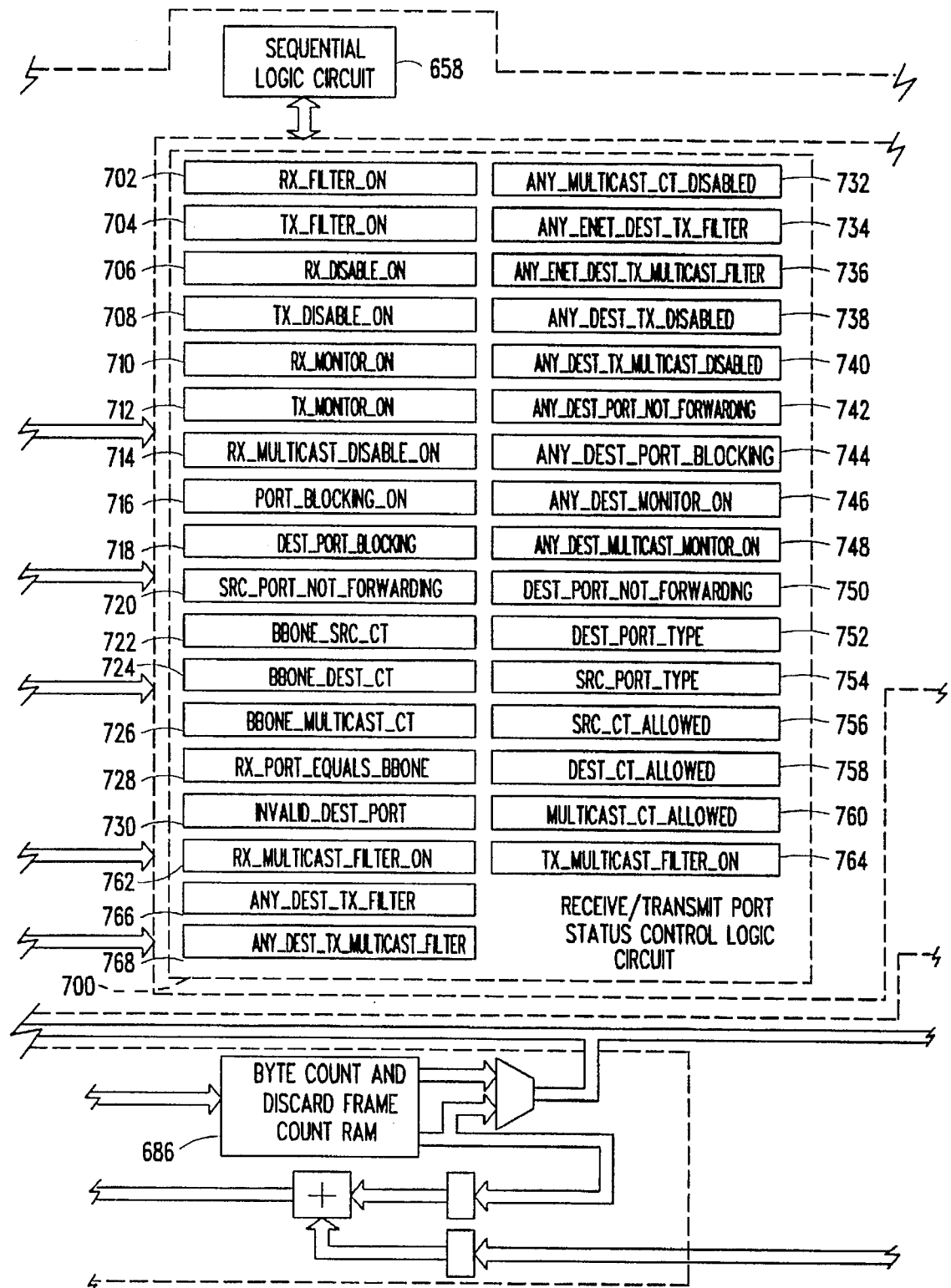
Figure 15C:
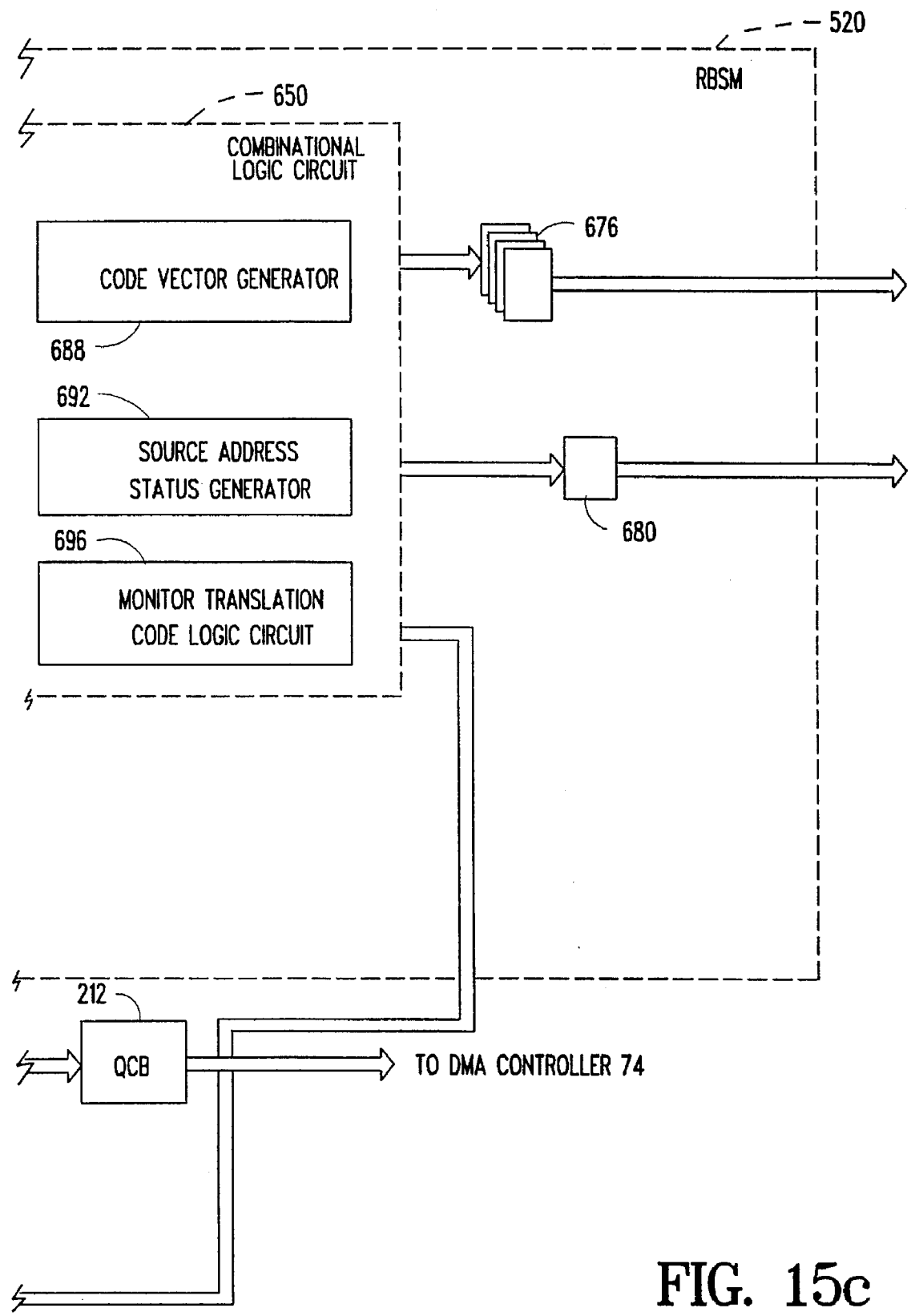

Referring to FIGS. 15a–c, although in one embodiment the RBSM 94 is, in actuality, a single ASIC, for the purposes of explanation, the RBSM 94 may be considered to include combinatorial logic 650, sequential logic 658, a plurality of state machines 780, 782, 784, 786 and a plurality of internal registers 660, 664, 474, 668, 672, 676, 680 which will be described in more detail below. The combinatorial logic 650 of the RBSM 94 generates, for each received packet 46, a Receive Queue entry 164 in response to the AMA Status FIFO 314, the receive status word 416, 418 in the Receive Status FIFO 306, and the Port Configuration word 480 in the Port Configuration register 474.

The RBSM 94 includes an AMA Status register 660 for storing the AMA status information received by the RBSM 94 from the AMA Status FIFO 314, a Receive Status register 664 for storing the receive status word 416, 418 received from the Receive Status FIFO 306, and Port configuration registers 474, which store configuration information regarding the ports, such as whether a filter is applied to the port or whether a port is enabled for cut-through.

Additionally, the RBSM 94 includes a Backbone Port register 668 which stores the port number associated with a network which has been designated as the backbone network for the purpose of positive forwarding. Positive forwarding is a feature whereby an incoming packet having a network address which is unknown to the AMA 32 is transmitted only to the designated backbone port. In this way, all the addresses in a network with a large number of nodes need not be stored by the AMA, since the backbone port is treated as a default port when the port corresponding to the destination address of a data packet is unknown.

The RBSM 94 also includes a Frame Fragment register 672, which stores the packet length above which an incoming packet is segmented into multiple packets for storage and transmission. This may occur, for example, if an FDDI packet 46''' having a length greater than 1518 bytes is to be transmitted to an Ethernet MAC 14 having a maximum Ethernet packet length of 1518 bytes.

The Port Configuration registers 474, the Backbone Port register 668, and the Frame Fragment register 672 are all loaded by the FPU 40 at system initialization. The RBSM 94 polls the AMA Status FIFOs 314, to determine if the status needs to be moved from the FIFOs 314 into registers 660. The combinatorial logic 650 then uses the status information loaded into the registers 660 to generate the code vector.

The Receive Queue entry 164, generated by the combinatorial logic 650 for each packet 46, is stored in an RBSM pipeline register 676 prior to being enqueued in the Receive Queue 162. A Buffer Number register 680 is used to store the address in memory of a buffer 180 which contains a packet 46 having a destination address on the same network as the source address. This address is provided to the Return Buffer state machine 114 for release of the buffer to its Free Buffer queue 154, for reuse.

The RBSM 94 additionally includes four state machines 780, 782, 784, 786 which control the operation of the RBSM 94. State machine 780 is a port scanner state machine which is used to determine if any of the ports have AMA status information and receive status information in the AMA Status FIFO 314 or Receive Status FIFO 306. If status is available, the state machine 780 will move the status from the FIFOs 314, 306 into registers 660, 664 so that the combinatorial logic 650 can process the information. The SRAM READ/WRITE state machine 782 is used to move the AMA status information from the AMA Status FIFO 314 and the Receive Queue entry 164 from the RBSM pipeline register 676 into SRAM, and to move the Receive Queue entry 164 from SRAM 28 into the receive head queue 562. The SRAM Read Modify Write State Machine 784 is used to update receive frame byte counts and discard frame counts which are stored in the byte count and discard frame count RAM 686. A Buffer List State Machine 786 provides the number of a buffer 180 which is to be released for reuse, that is, it provides the buffer number to the Return Buffer State machine 114.

The Sequential Logic circuit 658 stores the state of each port 14, 18 and, with information from the Port Scanner state machine 780, synchronizes the polling of the registers 660, 664, 474, 668, 672 by the Combinatorial Logic circuit 650, so that at any given time the Combinatorial Logic circuit 650 processes the information associated with a single packet 46.

Again, for the purposes of discussion, the Combinatorial Logic circuit 650 can be characterized as including a number of individual circuits including a Code Vector generator 688, a Source Address Status generator 692, a Monitor Translation Code Logic circuit 696 and a Receive/Transmit Port Status Control Logic circuit ("Control Logic circuit") 700. In actuality however, the Combinatorial Logic circuit 650 is a network of logic gates within the BMA 22 generated using a hardware descriptor language.

Briefly, the Code Vector generator 688 generates code vectors (bits thirty-one through twenty-seven 524 in the first word 526 of the Receive Queue entry 164) in response to input signals from the Control Logic circuit 700. The Source Address Status generator provides bits 1 and 0 (536) in the first word (526) of the Receive Queue entry 164 which indicate whether the source address was found in the table in AMA memory 36, whether the receive port is the same as the port upon which the source address was originally learned and whether the source address is a group address or a unicast address.

The Monitor Translation Code Logic circuit 696 provides bits seventeen through fifteen 546 in the second word 540 in the Receive Queue entry 164. These bits are used by the code vector generator 688 when a translation code vector for a source monitor (CV_MONITOR_SOURCE (vector 29)) or a destination monitor (CV_MONITOR_DESTINATION (vector 30)) is required. The monitor translation code indicates to the FPU 40 whether or not packet translation is required to send the received packet to the remote monitor.

The Control Logic circuit 700 is shown, again only for ease of discussion, to include thirty-four individual logic circuits 702–768, each providing a single output signal. Also, for the purposes of discussion the same name is used to designate both the particular logic circuit and the signal which the circuit generates. Each logic circuit 702–768 receives input from one or more registers 474, 660, 664, 668, 672 and produces an output signal in response thereto.

First considering each circuit which is responsive to a bit set in the Port Configuration word 480 in the Port Configuration register 474, the RX_FILTER_ON logic circuit 702 and the TX_FILTER_ON logic circuit 704 each provide a signal indicating whether a filter is to be applied to the receive port and the transmit port, respectively. Such signals are generated in response to the setting of bit four 496 and bit five 494, respectively, of the Port Configuration word 480. Similarly, the RX_DISABLE_ON logic circuit 706 and TX_DISABLE_ON logic circuit 708 each provide a signal indicating whether the respective transmit and receive paths are disabled in response to the setting of bits zero 504 and one 502, respectively, of the Port Configuration word 480. The RX_MONITOR_ON logic circuit 710 and the TX_MONITOR_ON logic circuit 712 are both responsive to bit twelve 484 of the Port Configuration word 480 to provide output signals indicative of whether remote monitoring is enabled for the respective port.

The RX_MULTICAST_DISABLE_ON logic circuit 714 is responsive to bit six 500 of the Port Configuration word 480 to generate a signal indicating whether the receive port is receptive to multicast transmissions, while the PORT_BLOCKING_ON logic circuit 716 generates a signal indicating whether the port being processed is in the blocking state. The PORT_BLOCKING_ON signal is generated in response to bit two 508 of the Port Configuration word 480. Likewise, the DEST_PORT_BLOCKING logic circuit 718 provides an output signal indicating whether port blocking is on for the destination port. The DEST_PORT_BLOCKING signal is generated in response to bit two 508 of the Port Configuration word 480 for the destination port. The DEST_PORT_FORWARDING logic circuit 750 is responsive to bit three 506 of the Port Configuration word 480 contained in the Port Configuration Registers 474 for the destination ports to indicate that the respective port is not forwarding, as described above. The RX_MULTICAST_FILTER_ON logic circuit 762 indicates that the receive multicast filter bit is set (bit eight 492 of the Port Configuration register 480). Similarly, the TX_MULTICAST_FILTER_ON logic circuit 764 indicates that the transmit multicast filter bit is set (bit seven 498 of the Port Configuration register 480).

The ANY_MULTICAST_CT_DISABLED logic circuit 732 indicates whether cut-through is disabled for any of the Ethernet ports 14 in response to bit eleven 486 of Port Configuration word 480. The ANY_ENET_DEST_TX_FILTER logic circuit 734 provides an output signal indicating whether any of the Ethernet ports 14 has a transmit filter applied thereto (as indicated by bit five 494 of Port Configuration word 480). The ANY_ENET_DEST_TX_MULTICAST_FILTER logic circuit 736 provides an output signal indicating whether any of the Ethernet ports 14 has a multicast transmit filter applied thereto (as indicated by bit nine 490 of Port Configuration word 480). The ANY_DEST_TX_FILTER logic circuit 766 is used to indicate if any of the possible destination ports has a transmit filter applied to it (bit five 494 of the Port Configuration word 480). The ANY_DEST_TX_MULTICAST_FILTER logic circuit 768 is used to indicate if any of the possible destination ports has a transmit multicast filter applied to it (bit nine 490 of the Port Configuration word 480). The ANY_DEST_TX_DISABLED logic circuit 738 is used to indicate if any of the possible transmit ports is disabled (bit one 502 of the Port Configuration word 480). The ANY_DEST_TX_MULTICAST_DISABLED logic circuit 740 indicates whether the transmit multicast path for any of the possible destination ports has been manually disabled (bit seven 498 of the Port Configuration word 480). The ANY_DEST_PORT_NOT_FORWARDING logic circuit 742 indicates whether any of the possible destination ports are not forwarding (bit three 506 of the Port Configuration word 480). The ANY_DEST_PORT_BLOCKING logic circuit 744 provides an output signal indicating whether any of the possible destination ports is in the internetworking device blocking state (bit two 508 of the Port Configuration word 480).

The following logic circuits are responsive to multiple bits being set in the Port Configuration word 480. The ANY_DEST_MONITOR_ON logic circuit 746 indicates whether any of the possible destination ports has its monitor bit set (bit twelve 484 of the Port Configuration word 480) and whether the following bits are not set: the transmit disable bit (bit one 502 of the Port Configuration word 480), the port blocking bit (bit two 508 of the Port Configuration word 480), and the port not forwarding bit (bit three 506 of the Port Configuration word 480). The ANY_DEST_MULTICAST_MONITOR_ON logic circuit 748 indicates whether any of the possible destination ports has its multicast monitor bit set (bit twelve 484 of the Port Configuration word 480) and whether the following bits are not set: the transmit disable bit (bit one 502 of the Port Configuration word 480), the transmit multicast disable bit (bit seven 498 of the Port Configuration word 480), the port blocking bit (bit two 508 of the Port Configuration word 480), and the port not forwarding bit (bit three 506 of the Port Configuration word 480).

Considering next the circuits which are responsive to signals from multiple registers, the BBONE_SRC_CT logic circuit 722 provides an output signal indicating that cut-through is enabled for the source port (bit ten 488 of Port Configuration word 480), that the low latency threshold has been reached as indicated by a signal from the DMA controller 74, that the AMA 32 has not located the source address in the address table of the AMA memory 36, and that the source address is not a multicast address. This circuit indicates to the RBSM 94 that the frame could be a cut_through frame and therefore the latency through the internetworking device can be lower than a frame which is completely stored before being forwarded. The BBONE_DEST_CT logic circuit 724 similarly provides an output signal indicating that cut-through is enabled for the backbone port (bit ten 488 of Port Configuration word 480), that the destination address (indicated by bit 31 382 of AMA Status word 380) was not found by the AMA 32 (i.e. that the destination port is the backbone port) and that the backbone port is an Ethernet port (bits fifteen through thirteen 482 of the Port Configuration word 480). The DEST_PORT_TYPE logic circuit 752 and SRC_PORT_TYPE logic circuit 754 provide signals representative of whether the destination and source ports, respectively, are Ethernet, FDDI, or unknown port types. These signals are provided in response to bits thirteen through fifteen 482 of the Port Configuration word 480 and bits twenty-two through sixteen 396 and bits six through zero 398, respectively, of the second word 394 of the AMA Status word 376 which is stored in the SRAM storage area 268 of buffer 180.

The SRC_CT_ALLOWED logic circuit 756 indicates that the cut-through for the source port being processed is enabled (bit ten 488 of the Port Configuration word 480 in the Port Configuration register 474), that the low latency threshold as indicated by a signal from the DMA controller 74 has been reached, that the AMA 32 has located the source address in the address table of the AMA memory 36 (bit 15 388 AMA Status word 380), that the source multicast address is not set (from a signal from the AMA), that the source address is not an internal address (from 398 AMA Status word), and that the frame was received on the same port from which the port address was first learned. The DEST_CT_ALLOWED logic circuit 758 provides an output signal indicating that the cut-through enable bit is enabled for the destination port is set (bit ten 488 of Port Configuration word 480), the destination port is an Ethernet port (bits fifteen through thirteen 482 of the Port Configuration word 480), the destination address was found by the AMA 32 (bit 31 382 of AMA Status word 380), that the destination port address is not an internal address (from 396 AMA Status word), and the destination port is not equal to the port on which the packet was received. The MULTICAST_CT_ALLOWED logic circuit 760 indicates that the source port multicast cut-through is enabled (bit eleven 486 of Port Configuration word 480) and that the destination address was not found by the AMA 32 in the address table in the AMA memory 36 (indicated by bit 31 (382) of the AMA Status word 380. The BBONE_MULTICAST_CT logic circuit 726 provides an output signal indicating that the source port multicast cut-through bit is enabled (bit eleven 486 in the Port Configuration word 480), that the destination and source addresses were not found by the AMA 32 (bits 31 382 and 15 388 of the AMA Status word 380), that the source cut-through is enabled (bit ten 488 of the Port Configuration word 480), the cut-through low latency level has been reached as set by the DMA controller 74 and that the receive port is a backbone port as indicated from the Backbone Port register 668. The INVALID_DEST_PORT logic circuit 730 indicates that the destination port is an invalid port, even though the AMA 32 located the destination address in the address table (bit 31 382 of the AMA Status word), but was unable to find a destination group address (bit 30 384 of the AMA Status word 380) and the destination address is not the internal address (AMA Status word 396). Finally, the RX_PORT_EQUALS_BBONE 728 logic circuit provides an output signal indicating whether the port being processed is the designated backbone port, and is responsive to only the Backbone Port register 668.

Again for the purposes of discussion only, what can be considered to be a second level of logic circuits utilize signals from the Receive/Transmit Port Status Control Logic circuit 700 and other registers to generate other intermediate signals which are used by the Code Vector generator 688. Again using the name of the circuit as the name of the signal generated by the circuit, an RBSM_FRAG logic circuit compares the byte count 472 of the received FDDI frame located in the FDDI Status entry 418 with the fragment threshold from the fragment register 672 and asserts an RBSM_FRAG signal if the byte count is greater than the threshold.

An RBSM_SA_STATUS logic circuit sets a signal identified as SRC_ADDRESS_STATUS with different values according to various parameters returned by the AMA 32 into the RBSM AMA Status registers 660. Specifically, if the source address match bit 388 of AMA Status word 380 is not set, SRC_ADDRESS_STATUS is set to SA_UNKNOWN. If the source port equal bit 390 of AMA Status word 380 is not set, the SRC_ADDRESS_STATUS is set to SA_KNOWN_WITH_BAD_PORT. If the source group address bit from the AMA 32 is set, the SRC_ADDRESS_STATUS is set to SA_MULTICAST. If none of these conditions hold SRC_ADDRESS_STATUS is set to SA_KNOWN_GOOD_PORT.

An RBSM_MULTI_BUFFER module is used to create two sequential circuits, one for each FDDI port. An FDDI frame can be up to 4500 bytes long. Therefore, a large FDDI frame would consume up to three 2 KB buffers. This module therefore is used to determine if more than one buffer has been consumed by the reception of an FDDI frame. The output of this FDDI_MULTI_BUFFER_MODULE is then used to generate the proper code vectors.

An RBSM_STATUS_REGISTER logic circuit sets a signal identified as FILTER_FRAME under certain defined conditions. The RBSM_UNLOAD logic circuit asserts a signal identified as FDDI_EOF in response to a RX_END_OF_BUFFER bit being not set. When the RX_END_OF_BUFFER bit is set all of the other bits in the received status word are ignored. If an FDDI frame spans more than one buffer, the DMA controller causes an entry to be loaded into the RECEIVE STATUS FIFO 306 with bit 16 set. The setting of this bit informs the RBSM 94 that more than one buffer is being used by the FDDI frame.

In addition, four other intermediate circuits named, DESTINATION_MONITOR, FILTER_FRAME, ENET_ABORT and FDDI_RX_ERROR, indicate whether all necessary conditions are met such that if a frame is to be transmitted to the destination port it should also be sent to the probe port, whether the frame is to be filtered, whether a transmission on the Ethernet has been aborted, and whether a receive error has occurred on an FDDI network, respectively.

The Code Vector generator 688 is responsive to the output signals generated by the Receive/Transmit Port Status Control Logic circuit 700 and the intermediate signals generated by the second level of intermediate logic circuits described above to provide one of thirty-two possible code vectors (TABLE 1). In one embodiment one of the possible code vectors is unused. For example, the CV_UNICAST_NO_TRANSLATION_CUTTHRU_END vector (vector 3) indicates that the processed packet 46 is intended for unicast transmission, that the source network type is the same as the destination network type (i.e., no translation required), that cut-through has begun, and that the end of the packet 46 has been received by the Ethernet MAC 14. This code vector (code vector 3) is generated in response to the ENET_ABORT signal not being asserted by the ENET_ABORT intermediate circuit, the CUT_THRU_END signal from the intermediate circuit RBSM_CT_ACTIVE being asserted, the ETHERNET_RX_ERROR signal and the RX_MONITOR_ON logic signal 710 not being asserted by the Logic circuits 700 above, and the DESTINATION_MONITOR signal and the FILTER_FRAME signals not being asserted by their respective intermediate logic circuits. The RBSM_CT_ACTIVE intermediate logic circuit is used to save the state of a port which has a cut-through frame in progress. Therefore, a cut-through begin code vector was issued and the state maintained until the end of frame condition occurs and the receive status arrives, in which case the CUT_THRU_END signal is generated and the CT_ACTIVE bit reset upon the generation of a cut-thru end code vector. In response to these signals, CV_UNICAST_NO_TRANSLATION_CUTTHRU_END (vector 3) is generated.

As mentioned above, the Monitor Translation Code Logic circuit 696 provides bits seventeen through fifteen 546 in the second word 540 in the Receive Queue entry 164 to indicate to the FPU 40 whether packet translation is required in order to send the received packet to a remote monitor (as enumerated in Table 2). This circuit, responsible for the generation of the eight Monitor Translation codes listed in Table 2, is generated by the RBSM_TRANS_CODE module.

These translation codes are generated by the monitor translation code logic circuit 696 in response to one or more input signals received from the Receive/Transmit Port Status Control logic circuit 700 and other intermediate circuits.

Figure 16:
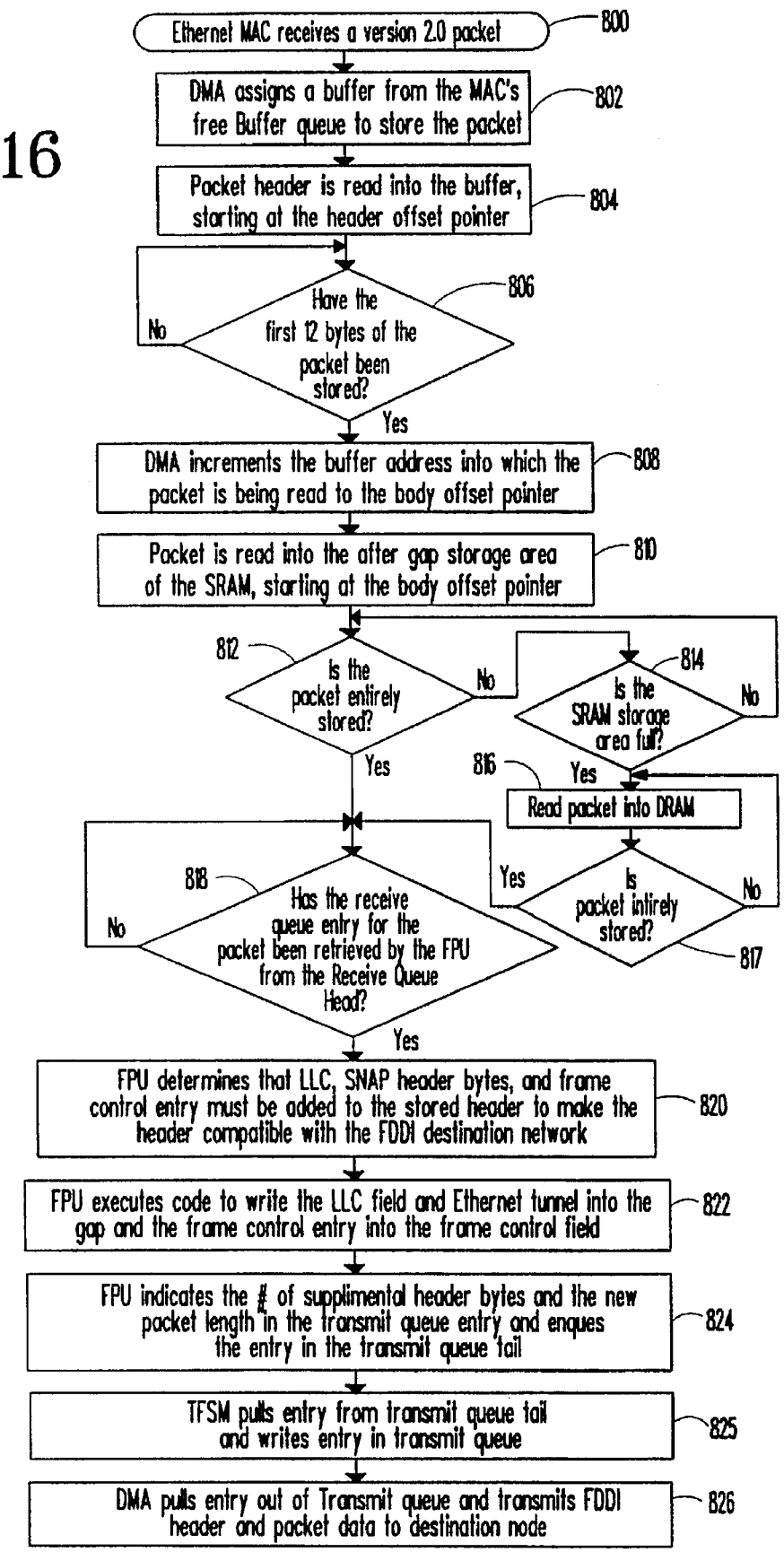
FIG. 16 is a flow diagram showing the translation of an Ethernet version 2.0 header into an FDDI header.

Referring to FIG. 16, a flow diagram of a process for translating an Ethernet version 2.0 header 48" (FIG. 2) into an FDDI header 48''' (FIG. 2) in accordance with the invention is shown. In process step 800, one of the Ethernet version 2.0 MACs 14 receives an Ethernet Version 2.0 packet 46". In step 802, the DMA controller 74 assigns a buffer 180 (FIG. 6) from the Free Buffer Prefetch Queue 200 associated with the receiving MAC 14 to store the incoming packet 46". Thereafter, the DMA controller 74 causes the packet header 48" to be read into memory addresses associated with the assigned buffer 180 in step 804.

More particularly, in step 804, the received packet header 48" is read into sequential buffer locations beginning at a location offset from the first location of the buffer by the header offset value 290. Specifically, the destination address 54" is read into the destination address field 282 and the source address 56" is read into the source address field 286.

As the header bytes are read into the buffer 180, the counter 336 in the DMA controller 74 is incremented. In process step 806, it is determined whether the counter is at a value of twelve, thereby indicating that the first twelve header bytes (i.e., the destination address 54" and the source address 56") have been read into the buffer 180. Step 806 is repeated until the first twelve packet bytes have been read into the buffer 180.

Once the DMA counter 336 is at a value of twelve, the DMA controller 74 increments the SRAM address to which the packet 46" is being transferred in accordance with the body offset value 320, in step 808. In the illustrative embodiment, the body offset value 320 is fixed at thirty-six bytes greater than the header offset value 290, corresponding to twelve bytes of destination address 282 and source address 286, the eight byte spacing 299, the four byte Receive Status field 310, the eight byte AMA field 318 and the four byte spacing 324. The effect of incrementing the buffer address in step 808 is to leave empty locations in the buffer 180 between the source address 48" and the length field 58" of the incoming Ethernet version 2.0 packet 46". Specifically, the empty memory locations provide a portion 299 of the translation gap 298, the Receive Status field 310 for later temporary storage of the Receive Status word 302, the AMA field 318 for later temporary storage of the AMA data, and portion 324 of the translation gap. In step 810, the packet 46" continues to be read into the buffer 180, and specifically, into the after gap storage area 328 of the SRAM storage area 268, starting at a location corresponding to the body offset value 320.

In step 812, it is determined whether the incoming packet 46" has been entirely stored. If the packet 46" has been entirely stored, then process step 818 is next performed. More particularly, if it is determined in step 812 that the packet 46" has been entirely stored, then the packet 46" is small enough to fit entirely in the SRAM storage area 268. If the packet 46" has not been entirely stored, it is next determined, in step 814, whether the after gap storage area 328 of the buffer 180 is full. If the after gap storage area 328 is not full, then steps 812 and 814 are periodically repeated until the area 328 has been filled. If, on the other hand, the after gap area 328 is full, then the remainder of the packet 46" is read into the DRAM storage area 332 of the buffer 180 in step 816. In step 817, it is determined whether the packet has been entirely stored. Step 816 is repeated if the packet has not been entirely stored. Alternatively, if it is determined that the packet has been entirely stored, then process step 818 is next performed.

In step 818, it is determined whether the Receive Queue entry 164 (FIGS. 12a and 12b) associated with the now fully stored packet 46" has been retrieved by the FPU 40 from the Receive queue head 560 (FIG. 3). Step 818 is periodically repeated until the respective Receive Queue entry 164 has been retrieved by the FPU 40 from the Receive queue head 560, after which the FPU 40 determines, in step 820, the type of header translation necessary, if any, in response to the code vector at bits thirty-one through twenty-seven 524 of the first word 526 of the Receive Queue entry 164.

In the case presently considered, the code vector generated by the RBSM 94 is vector four (assuming that the received packet 46" is intended for unicast transmission and that neither cut-through nor filters are applicable). In response to code vector four, the FPU 40 accesses the SRAM storage area 268 of the buffer 180 storing the processed packet to determine whether the packet is an Ethernet version 2.0 packet 46" or an Ethernet 802.3 packet 46' based on the type/length field 60, 58 of the stored packet, respectively. If the value in field 58, 60 is greater than or equal to a predetermined value, such as 1500, then the incoming packet is determined to be an Ethernet 802.3 packet 46'; whereas, if the value of the field 58, 60 is less than 1500, then the incoming packet is determined to be an Ethernet version 2.0 packet 46". In the present case, the FPU 40 finds that the value of the stored type field 60 is less than 1500 in step 820.

The code vector four and the determination that the stored packet is an Ethernet version 2.0 packet, indicate to the FPU 40 that an FDDI LLC field 62''' and Ethernet tunnel portion 64 (referred to hereinafter collectively as supplemental header bytes 62, 64) and an FDDI frame control entry 57 must be added to the stored Ethernet version 2.0 header 48" in order to translate the header 48" into an FDDI type header 48''', compatible with the FDDI destination network. To this end, in step 822, the FPU 40 executes code, stored in the FPU memory 44, which causes the supplemental header bytes 62, 64 and the frame control entry 57 to be written into the buffer 180. Specifically, the supplemental header bytes 62, 64 are written into the translation gap 298 of the buffer 180 and the frame control entry 57 is written into the FDDI frame control field 294.

With this arrangement, the buffer 180 now contains a translated packet having an FDDI format (46''') for transmission to the FDDI destination network. More particularly, the buffer 180 contains a frame control entry 57 in the frame control field 294, the received destination address 54" (providing the FDDI destination address 54''') in the destination address field 282, the received source address 56" (providing the FDDI source address 56''') in the source address field 286, the LLC field 62 and Ethernet tunnel portion 64 in the translation gap 298, the received type field 60 (providing the FDDI type field 66) starting at the body offset 320 in the SRAM storage area 268 and the received data 50" (providing the FDDI data 50''') following the type field 60 in the SRAM storage area 268 and, if the length of the data requires, also in the DRAM storage area 332. Thus, a first portion of the translated FDDI packet 46''', from the frame control entry 57 through the Ethernet tunnel 64, are stored in a first block of sequential buffer locations, starting at the header offset 290, and a second portion of the translated FDDI packet 46''', from the type field 60 through the data 50''', is stored in a second block of sequential buffer locations in the after gap storage area 328, starting at the body offset 320, and perhaps continuing into the DRAM storage area 332.

Notably, this storage arrangement of the translated FDDI packet 46''' is achieved without requiring storage and subsequent movement of portions of the received packet 46". Rather, translation is achieved by writing the frame control entry 57 and the supplemental header bytes 62, 64 into the frame control field 284 and translation gap 298, respectively. This arrangement advantageously reduces the number of memory accesses required for translation, as compared to prior art techniques in which the packet is first read into memory and then portions of the packet are read out of memory and rewritten into different memory locations to vacate memory locations for insertion of supplemental bytes.

The translation process of the present invention is further advantageous since, when it is necessary to access the memory for translation purposes, such as to write the supplemental header bytes therein, it is the SRAM storage area 298 that is accessed, as opposed to the DRAM storage area 332. In this way, the necessary memory accesses to achieve translation are faster than if the buffer were located entirely in DRAM. However, this processing speed benefit does not result in significant increased cost, since portions of the packet exceeding the size of the SRAM buffer portion are stored in DRAM.

Thereafter, in step 824, the FPU 40 indicates the number of supplemental header bytes 62, 64 written into the translation gap 298 in the Transmit Queue entry 160 (FIGS. 14a and 14b) for the translated packet 46'''. Also, the FPU 40 provides the new packet length (i.e., the length of the received Ethernet version 2.0 packet plus the number of supplemental header bytes 62, 64 and the frame control entry 57) in the Transmit Queue entry 160. Specifically, the number of supplemental header bytes 62, 64 is indicated in bits twenty-six through twenty-four (labelled 602 in FIG. 14a) of the first word 592 and the new packet length is indicated in bits twelve through zero (labelled 614 in FIG. 14b) of the second word 594 of the Transmit Queue entry 160. The FPU 40 then enqueues the Transmit Queue entry 160 in the Transmit Queue Tail 580.

In step 825, the TFSM 620 pulls an entry from the Transmit Queue Tail 580 and writes the entry into the designated Transmit Queue 158. Finally, in step 826, the BMA 22 transmits the translated FDDI packet 46''' to the FDDI destination network. More particularly, the DMA controller 74 retrieves the Transmit Queue entry 160 associated with the translated packet 46''' from the respective Transmit Queue 158 (FIG. 4a) and transmits the packet 46''' to the FDDI destination MAC 18 specified in bits thirty-one through twenty-six (labelled 612 in FIG. 14b) of the second word 594 of the Transmit Queue entry 160.

The translated packet 46''' is transmitted by reading the first thirteen bytes from the buffer 180, starting at the header offset 290 minus one (i.e., the frame control entry 57, the destination address 54''' and the source address 56'''). Thereafter, a number of bytes equal to the number of supplemental header bytes specified in bits twenty-six through twenty-four (labelled 602 in FIG. 14a) of the Transmit Queue entry 160 are transferred to the FDDI MAC 18 associated with the destination network (i.e., corresponding to the supplemental header bytes 62, 64). Finally, the data 50''' is transferred to the MAC 18, starting at the body offset 320 specified in bits ten through two (labelled 608 in FIG. 14a) of Transmit Queue entry 160. Note that in the case of translation from an Ethernet version 2.0 packet 46'' to an FDDI packet 46''', the body offset 608 specified in the Transmit Queue entry 160 is the same as the body offset 534 specified in the Receive Queue entry 164 and labelled 320 in FIG. 6 (i.e., thirty-six bytes beyond the header offset 290).

Figure 17:
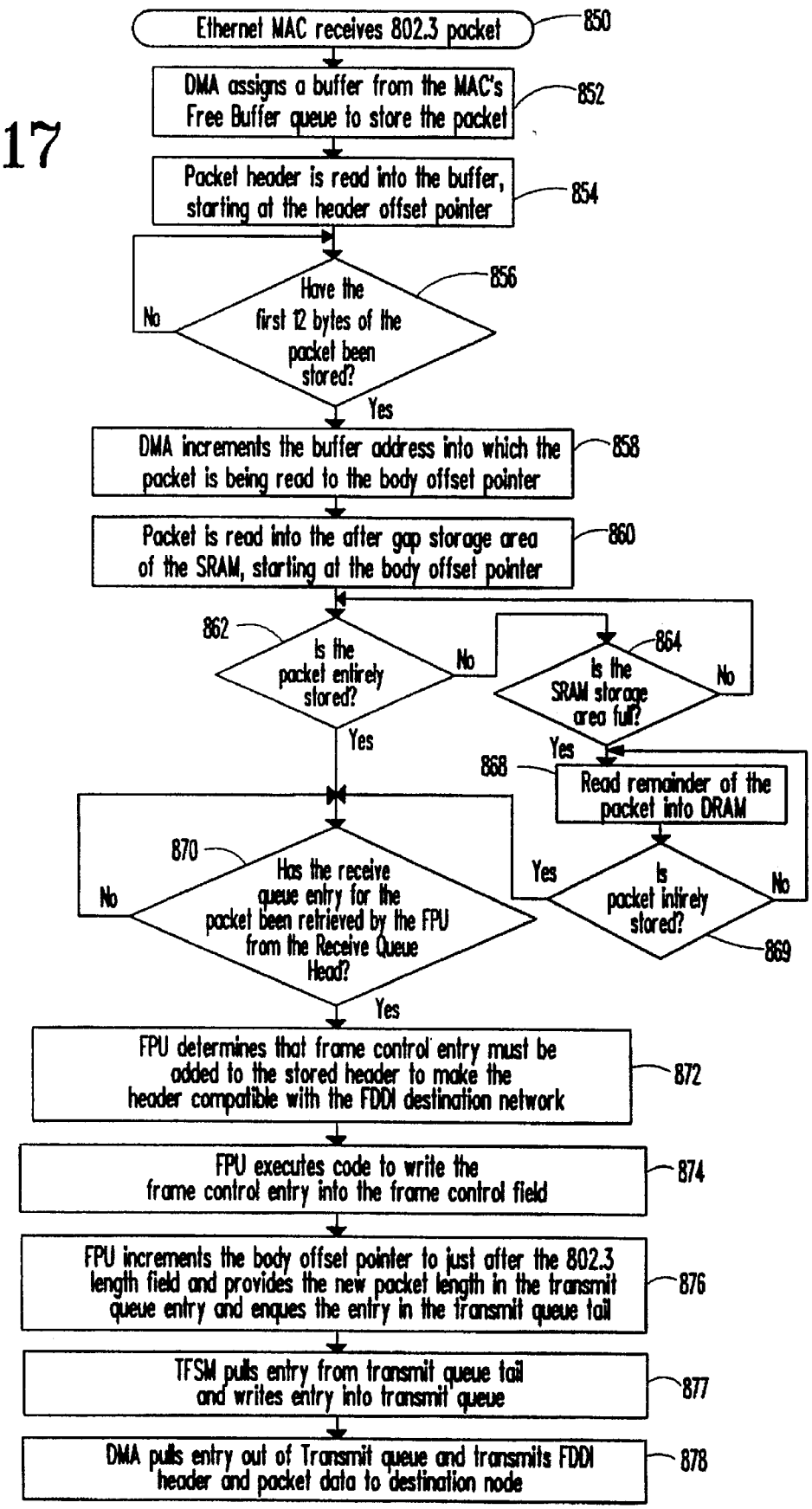
FIG. 17 is a flow diagram showing the translation of an Ethernet 802.3 header into an FDDI header.

Referring to FIG. 17, a flow diagram of the translation of an Ethernet 802.3 packet 46' into an FDDI packet 46''' is shown. Note that typically, when translating an Ethernet 802.3 packet 46' to an FDDI packet 46''', the FDDI packet does not require a SNAP header 68, as in the case presently considered. In process step 850, an Ethernet MAC 14 receives an Ethernet 802.3 packet 46'. The DMA controller 74 assigns a buffer 180 from the Free Buffer Prefetch Queue 200 associated with the receiving MAC 14 to store the incoming packet 46', in step 852. In step 854, the packet header 48' is read into the header storage area of the buffer 180, starting at the header offset 290. That is, the destination address 54' is read into the destination address field 282 and the source address 56' is read into the source address field 286.

The portion of the process for receiving an Ethernet 802.3 packet from steps 856–870 is identical to the process for receiving an Ethernet version 2.0 packet discussed above.

That is, in step 856, the counter 336 in the DMA controller 74 keeps a count of the bytes of the incoming packet 48' which have been stored to determine whether the first twelve bytes of the packet 46' have been read into memory. Process step 856 is repeated until the first twelve packet bytes have been read, following which the DMA controller 74 increments the buffer address into which the packet 48' is being read in accordance with the body offset 320, in step 858. Thereafter, in step 860, the packet 48' is read into the after gap storage area 328 of the SRAM storage area 268.

In step 862, it is determined whether the packet 46' has been entirely stored. If the packet has been entirely stored, then the process proceeds to step 870, thereby indicating that the packet 46' is small enough to fit entirely into the SRAM storage area 268. Alternatively, if the packet 48' was not entirely stored, then process step 864 is performed, in which it is determined whether the SRAM storage area 268 is full. If the SRAM storage area 268 is not full, then process steps 862 and 864 are repeated; whereas, once the SRAM storage area 268 is full, the remainder of the packet 46' is read into the DRAM storage area 332 in step 868. Thereafter, in step 869, it is determined whether the packet has been entirely stored. Step 868 is repeated until the packet is entirely stored. Once the packet is entirely stored, step 870 is next performed.

In process step 870, it is determined whether the Receive Queue entry 164 for the now stored packet 46' has been retrieved by the FPU 40 from the Receive queue head 560. Step 870 is repeated until the respective Receive Queue entry is retrieved by the FPU 40. In step 872, the FPU 40 determines, based on the code vector 524 provided in bits thirty-one through twenty-seven of the first word 526 of the respective Receive Queue entry 164, that a frame control entry 57 must be added to the stored Ethernet 802.3 header 48' to make the header compatible with the FDDI destination network. In the case presently considered, the code vector is vector four (assuming that the packet is intended for unicast transmission and neither filters nor cut-through apply) and, in response to this code vector, the FPU 40 determines whether the received packet is an Ethernet version 2.0 packet 46'' or an Ethernet 802.3 packet 46', in the manner discussed above.

In process step 874, the FPU 40 executes code to write the frame control entry 57 into the FDDI frame control field 294 (FIG. 6) of the buffer 180 in which the packet 46' is stored. With this arrangement, a packet of the FDDI format (46''') is stored in the buffer 180, with a frame control entry 57 in the frame control field 294, the received destination address 54' (providing the FDDI destination address 54''') in the destination address field 282, the received source address 56' (providing the FDDI source address 56''') in the source address field 286, the received length field 58 in the after gap storage area 328, starting at the body offset pointer 320, followed by the LLC field 62' and the Ethernet 802.3 data 50'.

The FPU 40 increments the body offset value 534, received in the Receive Queue entry 164 for the packet 46', in process step 876. More particularly, the FPU 40 increments the received body offset 534 by the length of the Ethernet 802.3 length field 58, so that the incremented offset corresponds to a location in the after gap storage area 328 just after the Ethernet 802.3 length field 58. The incremented offset 608 is inserted into the Transmit Queue entry 160 for the packet (i.e., at bits ten through two of the first word 592). Also in step 876 a new packet length 614 is inserted at bits twelve through zero into the second word 594 of the Transmit Queue entry 160 for the translated packet 46'''. The new packet length in this case, is equal to the packet length of the received Ethernet 802.3 packet 46' plus the added frame control entry 57 and minus the 802.3 length field 58, which is not transmitted with the packet, as described below. The FPU 40 then enqueues the Transmit Queue entry 160 into the Transmit Queue 158 associated with that entry.

In step 877, the TFSM 620 pulls the entry from the Transmit Queue Tail 580 and writes the entry into the respective Transmit Queue 158. In step 878, the DMA controller 74 pulls the entry 160 from the Transmit Queue 158 and transmits the translated, FDDI format header 48''' along with the packet data 50''' to the destination node. Specifically, the DMA controller 74 begins the transmission starting at the buffer location of the header offset 290 minus one, so as to start the transmission with the frame control entry 57. The DMA controller 74 next transmits the destination address 54''' from the destination address field 282 and the source address 56''' from the source address field 286.

The header supplement length 602 of the Transmit Queue entry 160, in this case, is at its initialized value of zero, indicating that no supplemental header bytes have been written into the translation gap 298 for transmission. Thus, the BMA 22 next transmits the received LLC field 62' (providing the translated FDDI LLC field 62''') and the received data 50' (providing the translated FDDI data 50'''), starting at the incremented body offset 608, thereby eliminating the Ethernet 802.3 length field 58 from the transmission.

Figure 18:
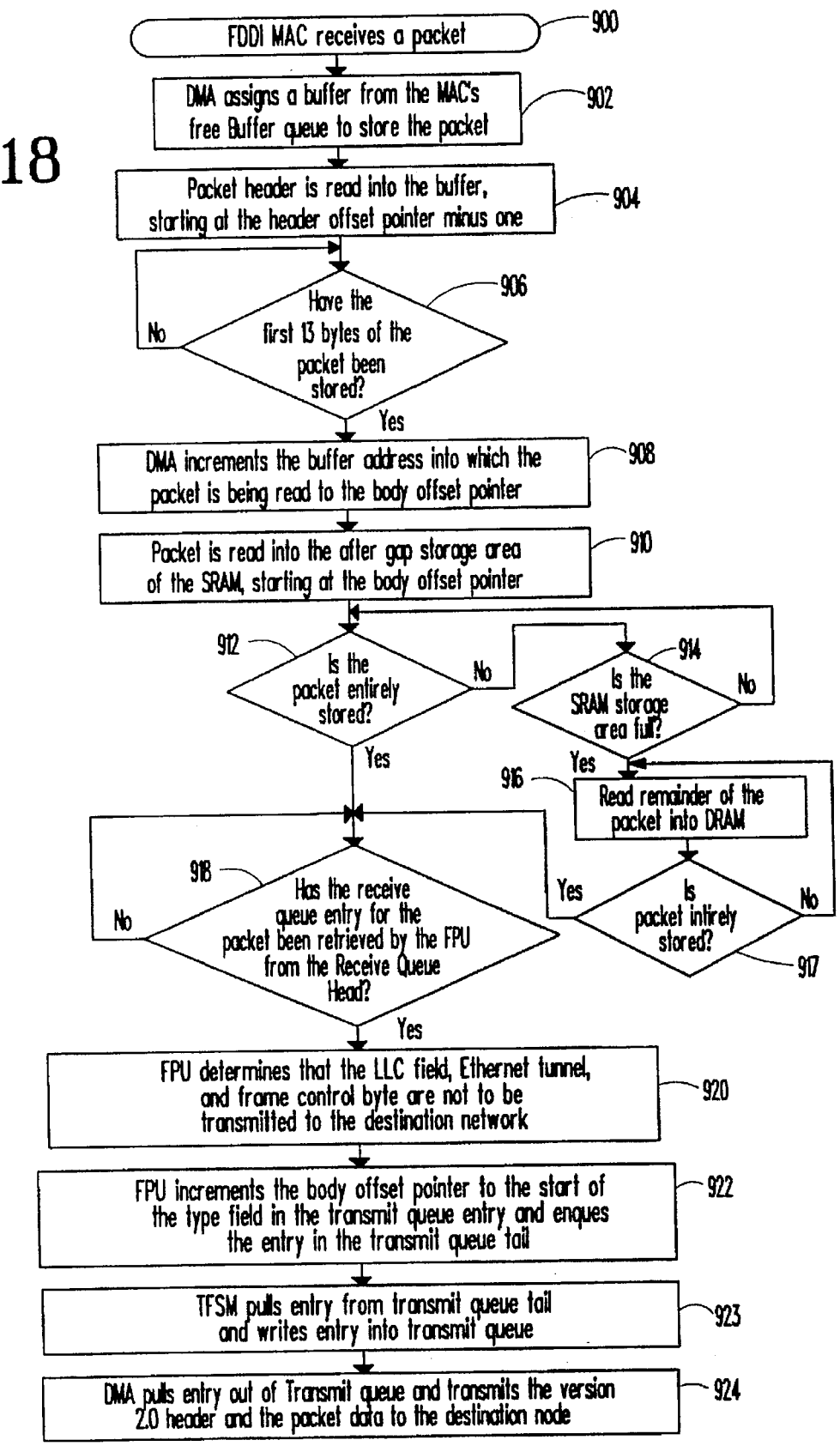
FIG. 18 is a flow diagram showing the translation of an FDDI header into an Ethernet version 2.0 header.

Referring to the flow diagram of FIG. 18, translation of an FDDI packet 46''' to an Ethernet version 2.0 packet 46'' is shown. Initially, an FDDI MAC 18 receives a packet 46''', in step 900. In process step 902, the DMA controller 74 assigns a buffer 180 from the Free Buffer Prefetch Queue 200 associated with the receiving MAC 18 to store the incoming FDDI packet 46'''. In step 904, the packet header 48''' is read into the buffer 180 starting at the location corresponding to the header offset 290 minus one. Thus, the frame control entry 57 is stored in the FDDI frame control field 294, the destination address 54''' is stored in the destination address field 282, and the source address 56''' is stored in the source address field 286.

In process step 906, it is determined whether the counter 336 in the DMA controller 74 has counted to thirteen, thereby indicating that the first thirteen bytes of the FDDI header 48''' have been read into the buffer 180. Step 906 is repeated until the counter 336 has counted to thirteen. Thereafter, process step 908 is performed, in which the DMA controller 74 increments the buffer address into which the packet 46''' is being read to the body offset 320. In this way, the translation gap 298, including spacing 299, the receive status field 310, the AMA field 318, and spacing 324, is provided in the buffer 180.

In process step 912, it is determined whether the packet 46''' has been entirely stored. If it is determined that the packet 46''' has been entirely stored, then process step 918 is thereafter performed, since the entire packet 46''' is small enough to be stored in the SRAM storage area 268. Alternatively, if the packet 46''' has not been entirely stored, then process step 914 is performed, in which it is determined whether the SRAM storage area 268 is full. Steps 912 and 914 are repeated until either the SRAM storage area 268 is filled or the packet is entirely stored. If the SRAM storage area 268 is filled, the remainder of the packet 46''' is read into the DRAM storage area 332, in step 916. In process step 917, it is determined whether the packet has been entirely stored. Step 916 is repeated if the packet has not been entirely stored. Alternatively, once the packet is entirely stored, step 918 is next performed.

It is thereafter determined, in step 918, whether the Receive Queue entry 164 for the now stored packet 46''' has been retrieved by the FPU 40 from the Receive queue head 560. Step 918 is repeated until the Receive Queue entry 164 is retrieved by the FPU 40.

In step 920, the FPU 40 determines the type of translation required, based on the code vector 524 contained in bits thirty-one through twenty-seven in the first word 526 of the Receive Queue entry 164. In the case of translating an FDDI packet 46''' into an Ethernet version 2.0 packet, the code vector is vector six (assuming that neither filters, multicast transmission, nor IP fragmentation apply). Code vector six indicates to the FPU 40 that the frame control entry 57 of the stored packet 46''', the LLC field 62''' of the stored packet 46''' and any Ethernet tunnel field 64 that may be included in the stored packet are not to be transmitted to the destination network.

In step 922, the FPU 40 increments the body offset 534 received in the Receive Queue entry 164 for the packet 46''' to provide an incremented body offset 608 corresponding to the start of the type field 66 of the stored packet 46'''. This incremented body offset 608 provides bits ten through two of the first word 592 of the Transmit Queue entry 160 for the translated packet 46''. With this arrangement, the received FDDI destination address 54''' provides the translated Ethernet version 2.0 destination address 54'', the received source address 56''' provides the translated source address 56'', the received FDDI type field 66 provides the translated Ethernet version 2.0 type field 60, and the received data 50''' provides the translated data 50''. Also in step 922, the FPU 40 enqueues the Transmit Queue entry 160 into the Transmit Queue Tail 580. Thereafter, in step 923, the TFSM 620 pulls the entry 160 from the Transmit Queue Tail 580 and writes the entry into the respective Transmit Queue 158.

In process step 924, the DMA controller 74 pulls the entry 160 from the Transmit Queue 158 and transmits the translated Ethernet version 2.0 packet 46'' to the destination node. Specifically, the DMA controller 74 transmits the stored header, starting at the header offset 290 so as to eliminate the frame control entry 57 from the transmission. Transmission of the destination address 56'' and source address 54'' are followed by the type field 60 stored starting at the incremented body offset 608. Thereafter the stored data 50'' is transmitted. Note that in the illustrative FDDI to Ethernet version 2.0 translation of FIG. 18, IP fragmentation does not apply, so that the translated FDDI packet is small enough to be transmitted to an Ethernet version 2.0 MAC 14 in a single packet (i.e., as opposed to being fragmented into multiple packets, each one having an IP header transmitted therewith as described above in conjunction with FIG. 13).

Figure 19:
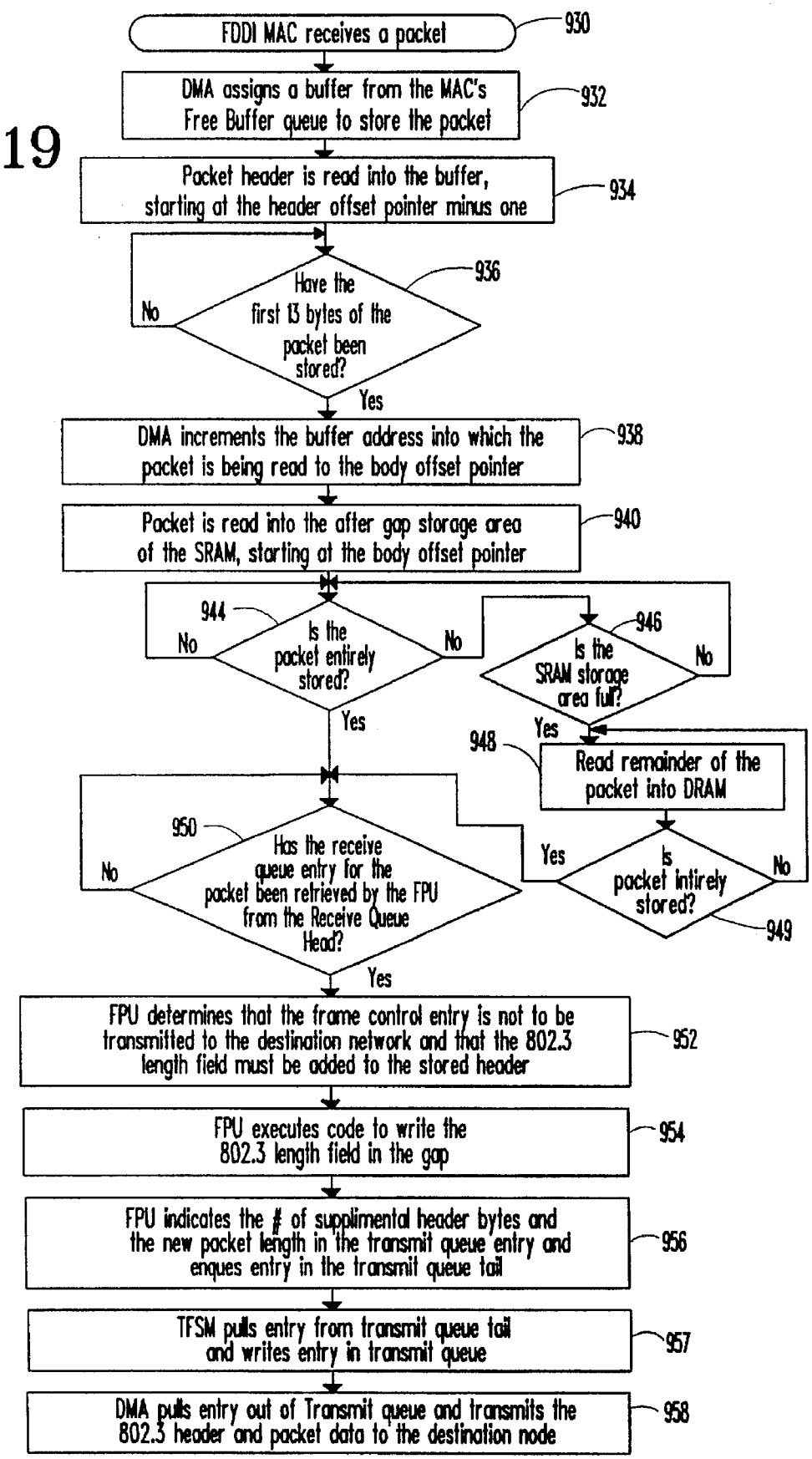
FIG. 19 is a flow diagram showing the translation of an FDDI header into an Ethernet 802.3 header.

Referring to the flow diagram of FIG. 19, a process for translating an FDDI packet 46''' into an Ethernet 802.3 packet 46' is shown. Initially, one of the FDDI MACs 18 receives an FDDI packet 46''' in step 930. Note that typically, when translating an FDDI packet 46''' to an Ethernet 802.3 packet 46', the FDDI packet 46''' does not include a SNAP header 68, as in the case presently considered. Process steps 932–950 are identical to steps 902–918 described above in conjunction with FIG. 18. That is, in step 932 the DMA controller 74 assigns a buffer 180 from the Free Buffer Prefetch Queue 200 of the receiving MAC 18 to store the incoming FDDI packet 46'''. In step 934, the packet header 48''' is read into the buffer 180, starting at the header offset 290 minus one. In step 936, it is determined whether the first thirteen header bytes of the incoming packet 46'" have been stored.

In step 938, the DMA controller 74 increments the buffer address into which the packet 46'" is being read to the body offset 320 which, in the illustrative embodiment is a fixed thirty-six bytes beyond the source address field 286. Thereafter, in step 940, the remainder of the packet 46'" is read into the after gap storage area 328 of the SRAM storage area 268, starting at the body offset 320. In step 944, it is determined whether the packet 46'" has been entirely stored. If the packet 46'" has not been entirely stored, then it is determined, in step 946, whether the SRAM storage area 268 is full. If the SRAM storage area 268 is full, then the remainder of the packet 46'" is read into the DRAM storage area 332 in step 948. In process step 949, it is determined whether the packet has been entirely stored. Step 949 is repeated if the packet has not been entirely stored. Alternatively, once the packet is entirely stored, step 950 is next performed. In process step 950, it is determined whether the Receive Queue entry 164 for the received packet 46'" has been retrieved by the FPU 40 from the Receive queue head 560.

In process step 952, the FPU 40 receives code vector six (assuming that neither filters, multicast transmission, nor IP fragmentation apply), indicating that the frame control entry 57 is not to be transmitted to the Ethernet 802.3 destination network and that the Ethernet 802.3 length field 58 must be added to the stored header, in order to translate the received FDDI header 48'" into an Ethernet 802.3 header 48'. More particularly, the FPU 40 determines that the received FDDI packet is to be translated into an Ethernet 802.3 packet (as opposed to an Ethernet 2.0 packet) by reading the type field 66 in the FDDI SNAP header 68 and determining that the length of the field 66 is less than 1500. In step 954, the FPU 40 executes appropriate code to write the Ethernet 802.3 length field 58 into the translation gap 298 of buffer 180. The bytes of the Ethernet 802.3 length field 58 thus provide supplemental header bytes 58. With this arrangement, the received FDDI destination address 54'" provides the translated Ethernet 802.3 destination address 54', the received source address 56'" provides the translated source address 56', the length field written into the translation gap 268 provides the 802.3 length field 58, and the received LLC field 62 and data 50'" provide the translated LLC field 62' and data 50'.

Thereafter, in step 956 the FPU 40 includes the number of supplemental header bytes 58 (i.e., the number of bytes contained in the Ethernet 802.3 length field 58) and the new packet length in the Transmit Queue entry 160 for the translated packet 46'. The new packet length is equal to the length of the received packet 46'" minus the length of the frame control entry 57 plus the length of the Ethernet 802.3 length field 58. Specifically, the number of supplemental bytes is indicated in bits twenty-six through twenty-four 602 of the first word 592 of the Transmit Queue entry 160 and the new packet length is indicated in bits twelve through zero 614 of the second word 594 of the Transmit Queue entry 160. Also in step 956, the Transmit Queue entry 160 is enqueued in the Transmit Queue Tail 580. In step 957, the TFSM 620 pulls the entry from the Transmit Queue Tail 580 and writes the entry into the respective Transmit Queue 158.

In step 958, the DMA controller 74 pulls the entry 160 from the respective Transmit Queue 158 and transmits the translated Ethernet 802.3 packet 46' to the destination node, in accordance with the Transmit Queue entry 160. First, the stored header, including the destination address and the source address, is transmitted, starting at the header offset 290, thereby preventing the frame control entry 57 from being transmitted. Thereafter, the Ethernet 802.3 length field 58, written into the translation gap 298, is transmitted. Specifically, the DMA controller 74 is instructed, via the header supplement length bits twenty-six through twenty-four 602 of the Transmit Queue entry 160 to transmit a number of bits after the source address 56' which correspond to the Ethernet 802.3 length field 58. Transmission of the translated Ethernet 802.3 packet 46' continues with the LLC field 62' and the data 50' stored in the buffer 180, starting at the body offset 320. Note that in the illustrative FDDI to Ethernet version 802.3 translation of FIG. 19, IP fragmentation does not apply, so that the translated FDDI packet is small enough to be transmitted to an Ethernet version 802.3 MAC 14 in a single packet (i.e., as opposed to being fragmented into multiple packets, each one having an IP header transmitted therewith as described above in conjunction with FIG. 13).

As is apparent from the above discussion, each buffer 180 (FIG. 6) has an SRAM portion 268 and a DRAM portion 332. More particularly, the translation gap 298 is provided in the SRAM portion 268. Use of the translation gap 298 for inserting additional, or supplemental header bytes in the buffer 180 where necessary for packet translation is advantageous since it is the SRAM portion 268 of the buffer 180 that is accessed. This is because SRAM is more quickly accessed than DRAM. Thus, by using SRAM for the portion of the buffer 180 to insert supplemental bytes accessed during translation, the processing time of translating one packet type to another is reduced. Moreover, the cost of the internetworking device is not unnecessarily increased since SRAM is judiciously used only for those portions of the buffer 180 accessed to insert supplemental bytes during translation.

Inserting supplemental header bytes into the translation gap 298 is further advantageous since the translated packet is thus stored sequentially in the buffer 180. That is, rather than simply inserting supplemental header bytes in a nonsequential location of the buffer 180 and using pointers to read the packet out of memory upon transmission, the described arrangement simplifies the transmission process. Specifically, upon transmission, any supplemental header bytes are read out of the buffer sequentially after the source address 56. Moreover, since the translation gap 298 is inserted as a received packet being is stored in a buffer, additional memory accesses for the purpose of moving a portion of the stored packet to make room for supplemental header bytes are eliminated.

Having described the preferred embodiment, those skilled in the art will realize many variations are possible which will still be within the scope and spirit of the claimed invention. For example, it will be appreciated that although the device of the present invention is described in conjunction with internetworking between Ethernet version 2.0 and FDDI networks or Ethernet 802.3 and FDDI networks, it will be appreciated that the circuitry and techniques described herein are readily adaptable for internetworking of other types of networks, such as token ring networks. Therefore, it is the intention to limit the invention only as indicated by the scope of the claims.

We claim:

1. An internetworking device for interconnecting a plurality of networks, said device comprising:

a memory comprising a plurality of buffers, each buffer assigned to a respective network and adapted for storing a packet received from said respective network, said packet including a header having an address portion; and a buffer manager, interconnecting said plurality of networks and said memory, said buffer manager controlling storage of said packet in one of said buffers assigned to said respective network, wherein said address portion of said header is separated from a remaining portion of said packet in said buffer by a gap.

2. The internetworking device recited in claim 1 further comprising a frame processor for inserting supplemental header information into said gap.

3. The internetworking device recited in claim 1 wherein said buffer manager comprises a first register for storing a header offset value corresponding to a first location in said buffer starting at which said address portion of said header is stored and a body offset value corresponding to a second location in said buffer starting at which said remaining portion of said packet is stored.

4. The internetworking device recited in claim 1 wherein each of said buffers comprises a first portion having a first access latency and a second portion having a second access latency, longer than said first access latency.

5. The internetworking device recited in claim 4 wherein said first portion of said buffers is SRAM and said second portion of said buffers is DRAM.

6. The internetworking device recited in claim 5 wherein said gap is provided in said SRAM portion of said buffers.

7. A buffer for storing a packet received by an internetworking device from a source network prior to transmission to a destination network, said packet including a header having an address portion, comprising:

a first storage area for storing said address portion of said packet header; and a second storage area for storing a portion of the remainder of said packet, wherein said first and second storage areas are spaced by a gap in said buffer.

8. The buffer recited in claim 7 wherein said gap is adapted to receive supplemental header information when said source network and said destination network are of different types.

9. The buffer recited in claim 7 further comprising a third storage area for storing said remainder of said packet, wherein said first and second storage areas have a first access latency and said third storage area has a second access latency, longer than said first access latency.

10. The buffer recited in claim 9 wherein said first and second storage areas are SRAM and said third storage area is DRAM.

11. A method for storing a packet having a header received by an internetworking device from a first network prior to transmission to a second network, comprising the steps of:

reading an address portion of said packet header into a first plurality of sequential locations of a buffer, starting at a header offset location; and reading a remaining portion of said packet into a second plurality of sequential locations of said buffer, starting at a body offset location, wherein said body offset location is spaced from said header offset location to provide a gap in said buffer after said address portion and before said remaining portion of said packet.

12. The method recited in claim 11 further comprising the step of writing supplemental header information into said gap in said buffer when said first and second networks are of different types.

13. An internetworking device for interconnecting a plurality of networks, said device comprising:

a memory comprising a plurality of buffers, each buffer assigned to a respective one of said plurality of networks and adapted for storing a packet received from said respective network, said packet including a header having an address portion, wherein each of said buffers comprises a first portion having a first access latency and a second portion having a second access latency longer than said first access latency; and a buffer manager, interconnecting said plurality of networks and said memory, said buffer manager controlling storage of said packet in one of said buffers assigned to said respective network.

14. The internetworking device recited in claim 13 wherein said first portion of each of said buffers is SRAM and said second portion of each of said buffers is DRAM.

15. The internetworking device recited in claim 14 wherein said buffer manager assigns addresses in said SRAM portion of said buffer for storing said address portion of said header.

16. The internetworking device recited in claim 13 wherein said buffer manager comprises a pair of registers, a first one of said registers storing a header offset value corresponding to a first location in said buffer starting at which said address portion of said header is stored, and a second one of said registers storing a body offset value corresponding to a second location in said buffer starting at which a remaining portion of said packet, following said address portion of said header, is stored.

17. An internetworking device for interconnecting a plurality of networks, said device comprising:

a memory comprising a plurality of buffers, each buffer assigned to a respective one of said plurality of networks and adapted for storing a packet received from said respective network, said packet including a header having an address portion, wherein each of said buffers comprises a first portion having a first access latency and a second portion having a second access latency longer than said first access latency and wherein said first portion of each of said buffers is SRAM and said second portion of each of said buffers is DRAM; and a buffer manager, interconnecting said plurality of networks and said memory, said buffer manager controlling storage of said packet in one of said buffers assigned to said respective network, wherein said buffer manager assigns addresses in said SRAM portion of said buffer for storing said address portion of said header and wherein said buffer manager increments said assigned addresses in said SRAM portion of said buffer once said address portion of said header has been stored, so as to provide a gap in the SRAM portion of said buffer between said address portion of said header and a remaining portion of said packet, following said address portion.

18. The internetworking device recited in claim 17 further comprising a frame processor adapted for accessing said SRAM portion of said buffer to insert supplemental header information into said gap to translate said packet header into a format compatible with one of said plurality of networks of a type different than said respective network from which said packet is received.

19. A memory for storing a packet during transmission of said packet from a first network to a second network, said packet having a predetermined length and including a header having an address portion, said memory comprising:

a first memory portion having a first access latency, said first memory portion having a predetermined size and being adapted to store at least said address portion of said header; and a second memory portion having a second access latency, longer than said first access latency and adapted to store a portion of said packet if said predetermined packet length exceeds said predetermined size of said first memory portion.

20. The memory recited in claim 19 wherein said first memory portion is SRAM and said second memory portion is DRAM.

21. The memory recited in claim 19 wherein said first memory portion is adapted to have a gap therein comprising a plurality of empty locations, wherein said gap is positioned after said address portion of said header.

22. A method for storing a packet during transmission of said packet from a first network to a second network, said packet having a predetermined length and including a header having an address portion, comprising the steps of:

storing said address portion of said header in a first portion of memory having a first access latency, said first portion of memory having a predetermined size; and storing a portion of said packet in a second portion of memory having a second access latency, longer than said first access latency if said predetermined packet length exceeds said predetermined size of said first portion of memory.

23. The method recited in claim 22 wherein said first portion of memory is SRAM and said second portion of memory is DRAM.

24. The method recited in claim 22 further comprising the steps of:

storing said address portion of said header in a first plurality of sequential locations of said first portion of memory;

storing a remaining portion of said packet in a second plurality of sequential locations of said first portion of memory; and spacing said first plurality of sequential locations of said first portion of memory from said second plurality of sequential locations of said first portion of memory to provide a gap between said address portion of said header and said remaining portion of said packet.

25. A method for storing a packet during transmission of said packet from a first network to a second network, said packet having a predetermined length and including a header having an address portion, comprising the steps of:

storing said address portion of said header in a first plurality of sequential locations of said first portion of memory having a first access latency, said first portion of memory having a predetermined size;

storing a remaining portion of said packet in a second plurality of sequential locations of said first portion of memory;

storing a portion of said packet in a second portion of memory having a second access latency, longer than said first access latency if said predetermined packet length exceeds said predetermined size of said first portion of memory;

spacing said first plurality of sequential locations of said first portion of memory from said second plurality of sequential locations of said first portion of memory to provide a gap between said address portion of said header and said remaining portion of said packet; and inserting supplemental header information into said gap to convert said received packet into a packet compatible with said second network.

* * * * *

UNITED STATES PATENT AND TRADEMARK OFFICE
CERTIFICATE OF CORRECTION

PATENT NO : 5,651,002                             Page 1 of 2

DATED     : July 22, 1997

INVENTOR(S): Stephen L. Van Seters, et al.

It is certified that error appears in the above-identified patent and that said Letters Patent is hereby corrected as shown below:

At column 40, after line 33, insert the following Tables 1 and 2:

TABLE 1

| Number | | Code Path Vectors |
|---|---|---|
| 0  | Unicast No Translation                   | ENET or FDDI |
| 1  | Unicast No Translation with Filters      | ENET (check for cut-thru or FDDI |
| 2  | Unicast No Translation Cut-thru          | ENET cut-thru only |
| 3  | Unicast No Translation Cut-Thru End      | ENET cut-thru only |
| 4  | Unicast Ethernet To FDDI                 | ENET only |
| 5  | Unicast Ethernet To FDDI with Filters    | ENET only |
| 6  | Unicast FDDI To Ethernet                 | FDDI only |
| 7  | Unicast FDDI To Ethernet with Filters    | FDDI only |
| 8  | Unicast FDDI To Ethernet Fragment        | FDDI only (check for multi-buffer) |
| 9  | Unicast DA Unknown                       | ENET or FDDI (check for multi-buffer) |
| 10 | Unicast Exception                        | ENET or FDDI (check for multi-buffer) |
| 11 | Multicast From Ethernet                  | ENET only (check for cut-thru) |
| 12 | Multicast From Ethernet Exception        | ENET only (check for cut-thru) |
| 13 | Multicast From Ethernet Cut-thru End     | ENET cut-thru only |
| 14 | Multicast From FDDI                      | FDDI only (no fragmentation required) |
| 15 | Multicast From FDDI Exception            | FDDI only (no fragmentation required) |
| 16 | Multicast From FDDI Fragmentation        | FDDI only (check for multi-buffer) |
| 17 | Multicast Exception                      | ENET or FDDI (check for multi-buffer) |
| 18 | Receive Frame Error                      | ENET (cut-thru) or FDDI (multi-buffer) |
| 19 | Non LLC Frame                            | FDDI only (check for multi-buffer) |
| 20 | Internal Unicast                         | ENET or FDDI (check for multi-buffer) |
| 21 | Internal Unicast Exception               | ENET or FDDI (check for multi-buffer) |
| 22 | Internal Multicast                       | ENET or FDDI (check for multi-buffer) |
| 23 | Internal Broadcast                       | ENET or FDDI (check for multi-buffer) |
| 24 | MULTI-buffer Not Last Buffer             | FDDI only |
| 25 | MULTI-buffer No Translation              | FDDI only |
| 26 | MULTI-buffer No Translation with Filters | FDDI only |
| 27 | MULTI-buffer Discard Frame               | FDDI only |
| 28 | reserved                                 | |
| 29 | Monitor Source                           | ENET (cut-thru) or FDDI (multi-buffer) |
| 30 | Monitor Destination                      | ENET (cut-thru) or FDDI (multi-buffer) |
| 31 | Receive Queue Empty                      | |

UNITED STATES PATENT AND TRADEMARK OFFICE
CERTIFICATE OF CORRECTION

PATENT NO : 5,651,002
DATED : July 22, 1997
INVENTOR(S) : Stephen L. Van Seters, et al.

It is certified that error appears in the above-identified patent and that said Letters Patent is hereby corrected as shown below:

TABLE 2

| Number | Code Path Vectors |
|--------|-------------------|
| 0 | Unicast No Translation |
| 1 | Unicast Ethernet To FDDI |
| 2 | Unicast FDDI To Ethernet |
| 3 | Unicast FDDI To Ethernet Fragmentation |
| 4 | Unicast DA Unknown |
| 5 | Multicast From Ethernet |
| 6 | Multicast From FDDI |
| 7 | Internal |

Signed and Sealed this

Fifth Day of December, 2000

Attest:

Attesting Officer

Q. TODD DICKINSON
Director of Patents and Trademarks